(12) United States Patent
Takahashi et al.

(10) Patent No.: US 11,521,337 B2
(45) Date of Patent: Dec. 6, 2022

(54) MAP GENERATION SYSTEM, MAP GENERATION METHOD, AND COMPUTER READABLE MEDIUM WHICH GENERATES LINEARIZATION INFORMATION CALCULATES A RELIABILITY DEGREE

(71) Applicant: Mitsubishi Electric Corporation, Tokyo (JP)

(72) Inventors: Yukako Takahashi, Tokyo (JP); Takuma Kadoya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/272,935

(22) PCT Filed: Oct. 9, 2019

(86) PCT No.: PCT/JP2019/039806
§ 371 (c)(1),
(2) Date: Mar. 3, 2021

(87) PCT Pub. No.: WO2020/090388
PCT Pub. Date: May 7, 2020

(65) Prior Publication Data
US 2021/0319602 A1  Oct. 14, 2021

(30) Foreign Application Priority Data

Oct. 29, 2018  (JP) .............................. JP2018-202601

(51) Int. Cl.
| | | |
|---|---|---|
| *G06T 11/20* | (2006.01) | |
| *G06T 7/13* | (2017.01) | |
| *G01C 21/00* | (2006.01) | |
| *G06T 11/60* | (2006.01) | |
| *G08G 1/0969* | (2006.01) | |
| *G06T 7/12* | (2017.01) | |

(Continued)

(52) U.S. Cl.
CPC ........ *G06T 11/203* (2013.01); *G01C 21/3819* (2020.08); *G06T 7/12* (2017.01);
(Continued)

(58) Field of Classification Search
None
See application file for complete search history.

(56) References Cited

U.S. PATENT DOCUMENTS

2008/0027627 A1 * 1/2008 Ikeda ....................... H04N 7/18
 382/104
2010/0295668 A1 * 11/2010 Kataoka ............... B62D 15/029
 701/533

(Continued)

FOREIGN PATENT DOCUMENTS

EP 3719781 A1 10/2020
JP 2009-223221 A 10/2009
(Continued)

OTHER PUBLICATIONS

International Search Report and Written Opinion dated Dec. 3, 2019, received for PCT Application PCT/JP2019/039806 Filed on Oct. 9, 2019, 8 pages including English Translation.

(Continued)

*Primary Examiner* — Jeffrey J Chow
(74) *Attorney, Agent, or Firm* — Xsensus LLP

(57) ABSTRACT

A map generation device (10) generates linearization information expressing at least one or the other of a marking line of a roadway and a road shoulder edge based on measurement information of a periphery of the roadway. The measurement information is obtained by a measurement device. The map generation device (10) calculates an evaluation value expressing a reliability degree of partial information, for each partial information constituting the linearization information. A map editing device (20) displays the partial information in different modes according to the evaluation value, thereby displaying the linearization information. The map editing device (20) accepts input of editing information for the displayed linearization information.

13 Claims, 35 Drawing Sheets

(51) Int. Cl.
*G06T 7/136* (2017.01)
*G06V 20/56* (2022.01)

(52) U.S. Cl.
CPC ............... *G06T 7/13* (2017.01); *G06T 7/136* (2017.01); *G06T 11/60* (2013.01); *G06V 20/56* (2022.01); *G06V 20/588* (2022.01); *G08G 1/0969* (2013.01); *G06T 2200/24* (2013.01); *G06T 2207/10028* (2013.01); *G06T 2207/30256* (2013.01); *G06T 2210/56* (2013.01)

(56) References Cited

U.S. PATENT DOCUMENTS

| | | | | |
|---|---|---|---|---|
| 2010/0299000 A1* | 11/2010 | Nakamura | ............ | G08G 1/167 701/1 |
| 2012/0212612 A1* | 8/2012 | Imai | ............ | G06V 20/588 348/148 |
| 2017/0021765 A1* | 1/2017 | Mori | ............ | B60Q 9/00 |
| 2017/0043773 A1 | 2/2017 | Watanabe | | |
| 2018/0189578 A1* | 7/2018 | Yang | ............ | G01C 21/32 |
| 2018/0284798 A1* | 10/2018 | Kita | ............ | G06V 10/457 |
| 2019/0347493 A1* | 11/2019 | Chen | ............ | G08G 1/167 |
| 2021/0394779 A1* | 12/2021 | Okada | ............ | G06V 10/62 |

FOREIGN PATENT DOCUMENTS

| | | |
|---|---|---|
| JP | 2017-37472 A | 2/2017 |
| JP | 2018-73208 A | 5/2018 |
| WO | 2019/103150 A1 | 5/2019 |

OTHER PUBLICATIONS

Extended European Search Report (EESR) dated Nov. 26, 2021 in corresponding European Patent Application No. 19 878 542.0.

* cited by examiner

Fig. 34

| GRAPHIC DATA NUMBER | EVALUATION ITEM A | EVALUATION ITEM B | EVALUATION ITEM C | CORRECTION DONE OR NOT |
|---|---|---|---|---|
| 1 | 1.0 | 0.8 | 0.8 | NOT DONE |
| 2 | 0.4 | 1.0 | 0.8 | DONE |
| 3 | 0.3 | 0.5 | 1.0 | DONE |
| 4 | 1.0 | 0.3 | 0.8 | NOT DONE |
| 5 | 1.0 | 0.9 | 0.2 | NOT DONE |
| 6 | 0.9 | 0.3 | 0.2 | DONE |
| 7 | 0.3 | 0.9 | 0.4 | NOT DONE |
| 8 | 0.5 | 0.2 | 0.3 | DONE |

Fig. 35

| GRAPHIC DATA NUMBER | EVALUATION ITEM A | EVALUATION ITEM B | EVALUATION ITEM C | COMPREHENSIVE EVALUATION VALUE |
|---|---|---|---|---|
| 11 | 1.0 | 0.9 | 0.8 | 0.9 |
| 12 | 0.3 | 0.8 | 0.7 | 0.4 |
| 13 | 0.9 | 0.8 | 0.4 | 0.8 |
| 14 | 0.9 | 0.3 | 0.3 | 0.3 |
| 15 | 0.8 | 0.3 | 0.8 | 0.7 |

MAP GENERATION SYSTEM, MAP GENERATION METHOD, AND COMPUTER READABLE MEDIUM WHICH GENERATES LINEARIZATION INFORMATION CALCULATES A RELIABILITY DEGREE

CROSS-REFERENCE TO RELATED APPLICATIONS

The present application is based on PCT filing PCT/JP2019/039806, filed Oct. 9, 2019, which claims priority to JP 2018-202601, filed on Oct. 29, 2018, the entire contents of each are incorporated herein by reference.

TECHNICAL FIELD

The present invention relates to a technique of generating information such as a marking line and a road shoulder edge of a roadway based on measured information obtained by a measurement device about a periphery of the roadway.

BACKGROUND ART

In recent years, development of autonomous traveling cars has been promoted. In order to realize autonomous traveling, high-precision map information is required in addition to various sensors such as a camera and a laser radar which are attached to an autonomous traveling car. As a method of generating high-precision map information, studies have been made on obtaining three-dimensional point cloud information of a feature such as a road surface and roadside equipment by running a measurement vehicle called mobile mapping system (MMS), and generating map information based on the three-dimensional point cloud information.

A graphics process of generating the map information based on the three-dimensional point cloud information is, for example, a process of generating a line expressing a boundary position, such as a marking road line on a road and a road shoulder edge which are necessary as map information, from the three-dimensional point could information. Information that expresses this line is called linearization information.

Patent Literature 1 indicates generating an orthogonal image of a photographed image of a road viewed from right above the road and recognizing a road surface sign from the two-dimensional image. Patent Literature 2 indicates generating linearization information of a feature from a plurality of still image of a road and detecting deviation of the linearization information by comparison of different images.

CITATION LIST

Patent Literature

Patent Literature 1: JP 2009-223221 A
Patent Literature 2: 2018-73208 A

SUMMARY OF INVENTION

Technical Problem

In the methods indicated in Patent Literatures 1 and 2, since linearization information is generated by comparing and synthesizing a plurality of images, image comparison and a synthesis process become complicated. This makes it difficult to automatically detect an error portion in the linearization information. Hence, it is necessary to manually find the error portion in the linearization information and perform an error correction process. However, the work of manually finding the error portion takes a lot of work.

An objective of the present invention is to enable manual correction of an error in linearization information efficiently.

Solution to Problem

A map generation system according to the present invention includes:

a graphics unit to generate linearization information expressing at least one or the other of a marking line of a roadway and a road shoulder edge based on measurement information of a periphery of the roadway, the measurement information being obtained by a measurement device;

an evaluation unit to calculate an evaluation value expressing a reliability degree of partial information, for each partial information constituting the linearization information generated by the graphics unit; and a display unit to display the partial information in different modes according to the evaluation value calculated by the evaluation unit, thereby displaying the linearization information.

Advantageous Effects of Invention

In the present invention, partial information of linearization information is displayed in different display modes according to evaluation values. As a result, a portion that is likely to be incorrect in the linearization information can be identified easily. Therefore, it is possible to efficiently correct an error in the linearization information manually. Hence, manual correction of the error in the linearization information can be performed efficiently.

BRIEF DESCRIPTION OF DRAWINGS

FIG. 34 is a diagram according to Embodiment 3 illustrating an example of data which an evaluation function learning unit 117 employs for learning.

FIG. 35 is a diagram according to Embodiment 3 illustrating examples of comprehensive evaluation values after learning.

DESCRIPTION OF EMBODIMENTS

Embodiment 1

*Description of Configurations*

Figure 1:
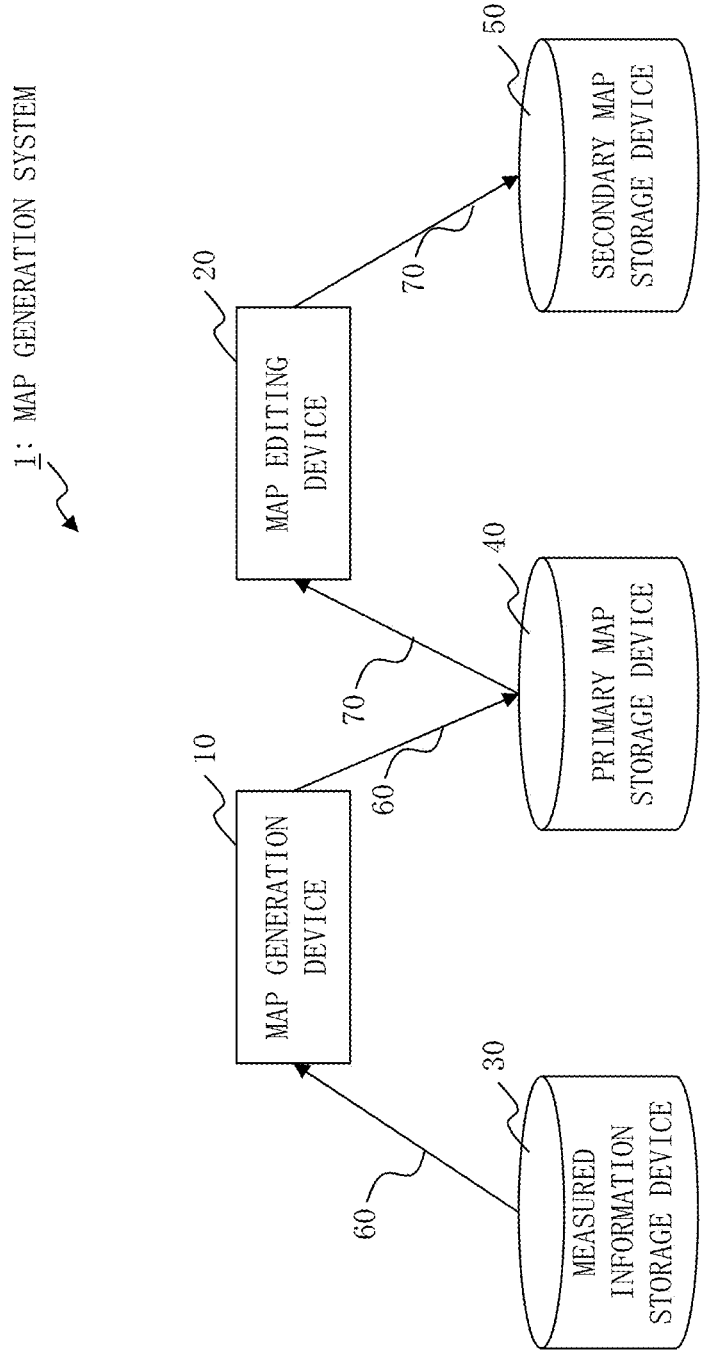
FIG. 1 is a configuration diagram of a map generation system 1 according to Embodiment 1.

A configuration of a map generation system 1 according to Embodiment 1 will be described with referring to FIG. 1.

The map generation system 1 is provided with a map generation device 10, a map editing device 20, a measured information storage device 30, a primary map storage device 40, and a secondary map storage device 50.

The map generation device 10 is connected to the measured information storage device 30 and the primary map storage device 40 via transmission lines 60. The map editing device 20 is connected to the primary map storage device 40 and the secondary map storage device 50 via transmission lines 70.

In FIG. 1, the map generation device 10 and the map editing device 20 are formed as separate devices. However, the map generation device 10 and the map editing device 20 may be formed as one device.

A configuration of the map generation device 10 according to Embodiment 1 will be described with referring to FIG. 2.

The map generation device 10 is a computer.

The map generation device 10 is provided with hardware devices which are a processor 11, a memory 12, a storage 13, and a communication interface 14. The processor 11 is connected to the other hardware devices via a signal line and controls the other hardware devices.

The map generation device 10 is provided with a measured information acquisition unit 111, a graphics unit 112, and an evaluation unit 113, as function constituent elements. The graphics unit 112 is provided with a candidate point extraction unit 114, a candidate point connection unit 115, and a correction unit 116. Functions of the individual function constituent elements of the map generation device 10 are implemented by software.

A program that implements the functions of the individual function constituent elements of the map generation device 10 is stored in the storage 13. This program is read into the memory 12 by the processor 11 and is executed by the processor 11. The functions of the individual function constituent elements of the map generation device 10 are thus implemented.

Figure 3:
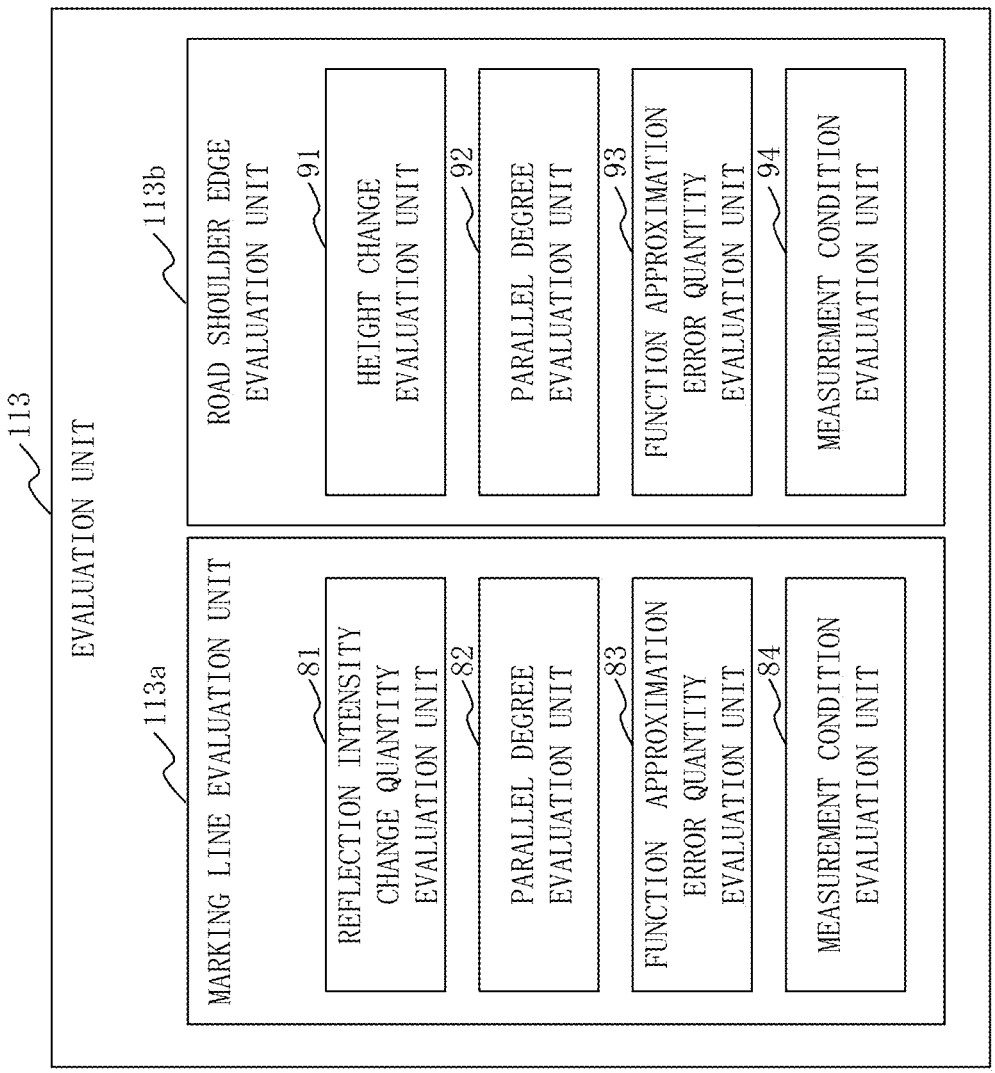
FIG. 3 is a configuration diagram of an evaluation unit 113 according to Embodiment 1.

A configuration of the evaluation unit 113 according to Embodiment 1 will be described with referring to FIG. 3.

The evaluation unit 113 is provided with a marking line evaluation unit 113a and a road shoulder edge evaluation unit 113b.

The marking line evaluation unit 113a is provided with a reflection intensity change quantity evaluation unit 81, a parallel degree evaluation unit 82, a function approximation error quantity evaluation unit 83, and a measurement condition evaluation unit 84.

The road shoulder edge evaluation unit 113b is provided with a height change evaluation unit 91, a parallel degree evaluation unit 92, a function approximation error quantity evaluation unit 93, and a measurement condition evaluation unit 94.

Figure 4:
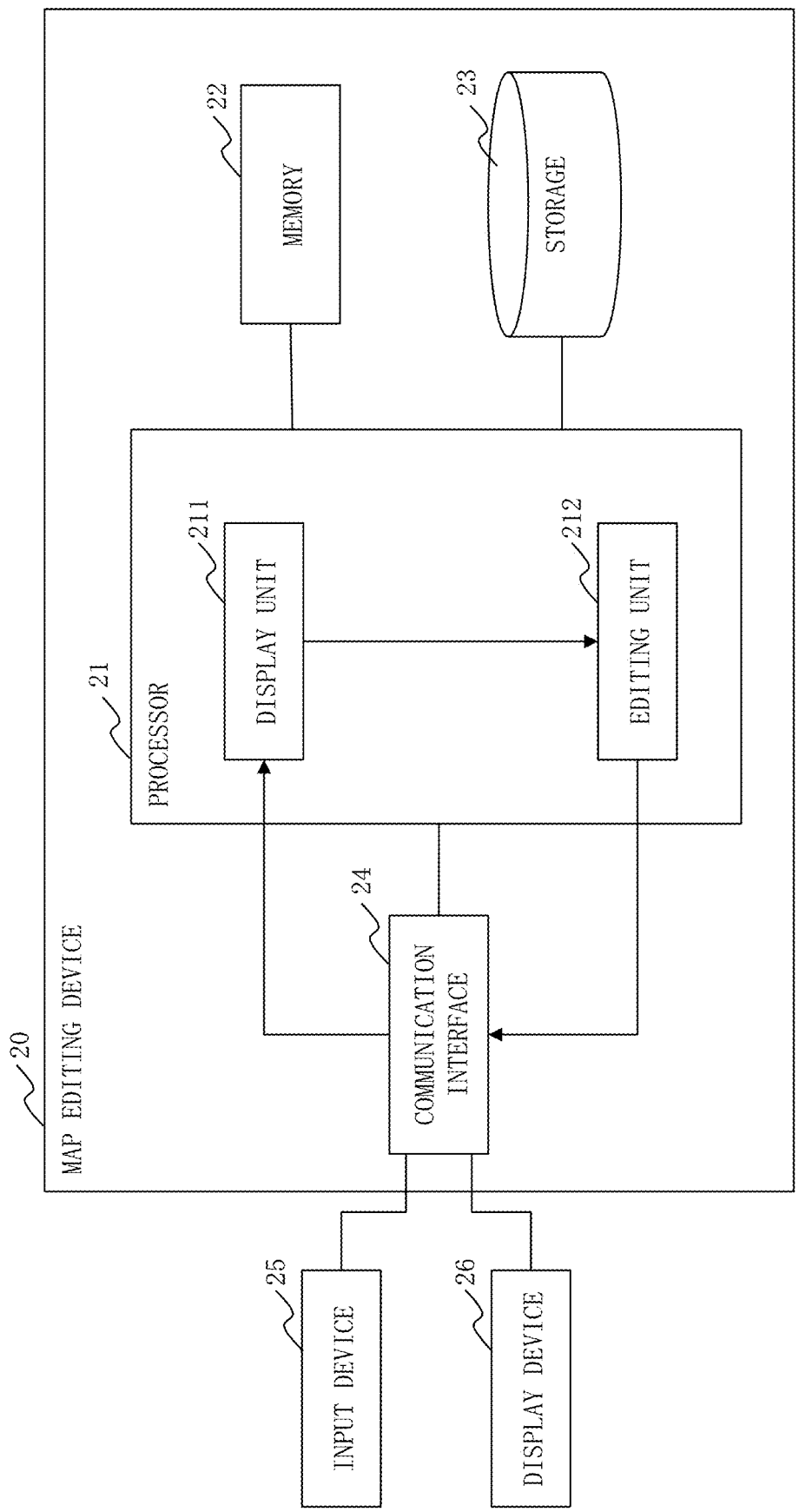
FIG. 4 is a configuration diagram of a map editing device 20 according to Embodiment 1.

A configuration of the map editing device 20 according to Embodiment 1 will be described with referring to FIG. 4.

The map editing device 20 is a computer.

The map editing device 20 is provided with hardware devices which are a processor 21, a memory 22, a storage 23, and a communication interface 24. The processor 21 is connected to the other hardware devices via a signal line and controls the other hardware devices.

The map editing device 20 is connected to an input device 25 and a display device 26 via the communication interface 24.

The map editing device 20 is provided with a display unit 211 and an editing unit 212 as function constituent elements. Functions of the individual function constituent elements of the map editing device 20 are implemented by software.

A program that implements the functions of the individual function constituent elements of the map editing device 20 is stored in the storage 23. This program is read into the memory 22 by the processor 21 and executed by the processor 21. The functions of the individual function constituent elements of the map editing device 20 are thus implemented.

The processors 11 and 21 are each an Integrated Circuit (IC) which performs processing. Specific examples of the processors 11 and 21 include a Central Processing Unit (CPU), a Digital Signal Processor (DSP), and a Graphics Processing Unit (GPU).

The memories 12 and 22 are each a storage device which stores data temporarily. Specific examples of the memories 12 and 22 include a Static Random-Access Memory (SRAM) and a Dynamic Random-Access Memory (DRAM).

The storages 13 and 23 are each a storage device which stores data. Specific examples of the storages 13 and 23 include a Hard Disk Drive (HDD). The storages 13 and 23 may be each a portable recording medium such as a Secure Digital (SD; registered trademark) memory card, a CompactFlash (registered trademark; CF), a NAND flash, a flexible disk, an optical disk, a compact disk, a blu-ray (registered trademark) disk, and a Digital Versatile Disk (DVD).

The communication interfaces 14 and 24 are each an interface to communicate with an external device. Specific examples of the communication interfaces 14 and 24 include an Ethernet (registered trademark) port, a Universal Serial Bus (USB) port, and a High-Definition Multimedia Interface (HDMI; registered trademark) port.

The input device 25 is a device that accepts input from a user. Specific examples of the input device 25 include a keyboard and a mouse.

The display device 26 is a device that displays information. Specific examples of the display device 26 include a Liquid Crystal Display (LCD).

Figure 2:
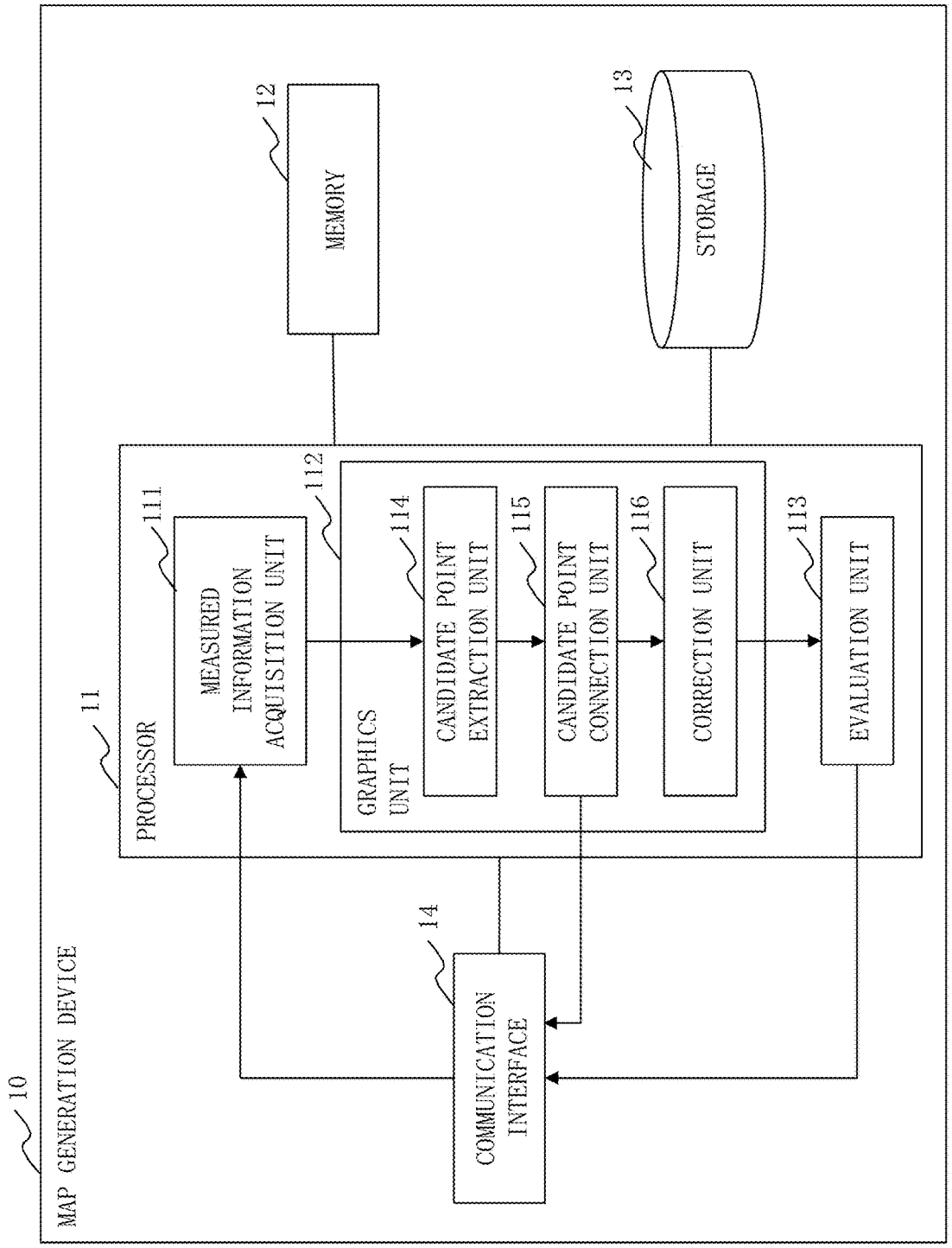
FIG. 2 is a configuration diagram of a map generation device 10 according to Embodiment 1.

FIG. 2 illustrates only one processor 11. However, a plurality of processors 11 may be provided. The plurality of processors 11 may cooperate with each other to execute the program that implements the individual functions. Likewise, FIG. 4 illustrates only one processor 21. However, a plurality of processors 21 may be provided. The plurality of processors 21 may cooperate with each other to execute the program that implements the individual functions.

*Description of Operations*

Operations of the map generation system 1 according to Embodiment 1 will be described with referring to FIGS. 5 to 26.

The operations of the map generation system 1 according to Embodiment 1 correspond to a map generation method according to Embodiment 1. The operations of the map generation system 1 according to Embodiment 1 also correspond to processing of a map generation program according to Embodiment 1.

Overall processing of the map generation system 1 according to Embodiment 1 will be described with referring to FIG. 5.

Figure 5:
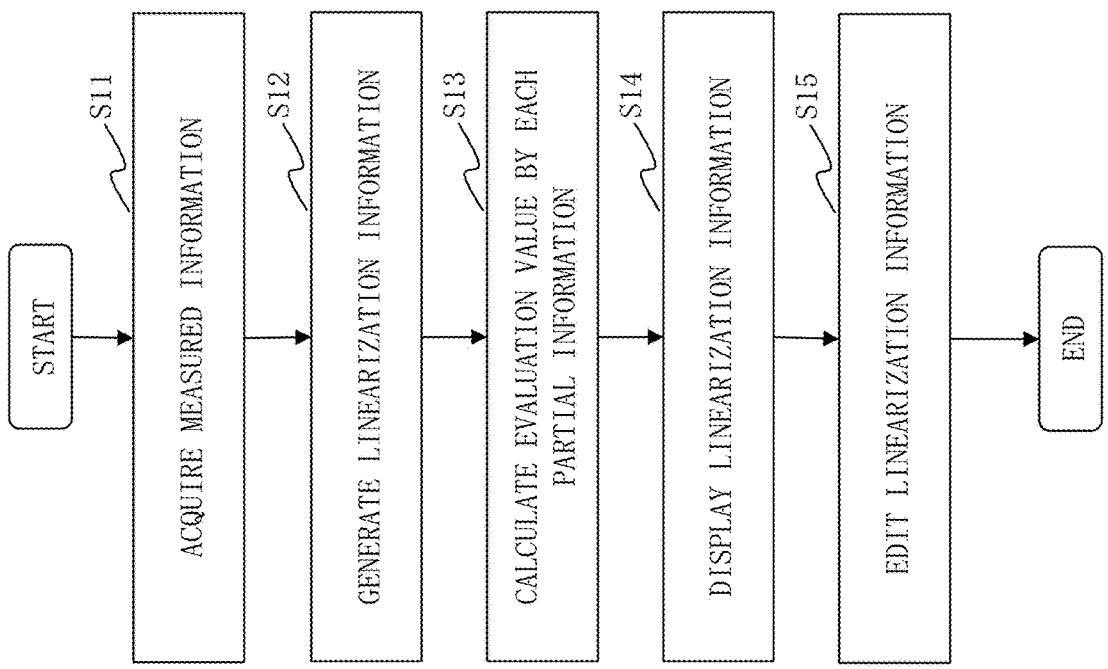
FIG. 5 is a flowchart of overall processing of the map generation system 1 according to Embodiment 1.

(Step S11 of FIG. 5: Measured Information Acquisition Process)

The measured information acquisition unit 111 of the map generation device 10 acquires measured information stored in the measured information storage device 30.

The measured information is information obtained by measuring a periphery of a roadway with a measurement device mounted on a measurement vehicle such as MIMS, while the measurement vehicle travels the roadway. According to a specific example, the measurement device is a device such as a laser radar and a camera. The measured information includes point cloud data being a plurality of pieces of point data obtained by the laser radar and expressing a position of a feature on the periphery of the roadway, and image data, obtained by the camera, of the periphery of the roadway. The measured information also includes moving trace information expressing a trace of traveling positions of the measurement vehicle. The measured information also includes posture data expressing a posture of the measurement vehicle, and calibration data expressing a position and posture of the measurement device.

The traveling position of the measurement vehicle is identified based on a positioning signal received by a positioning antenna mounted on the measurement vehicle. Specific examples of the positioning antenna include a Global Positioning System (GPS) antenna.

The measured information is not limited to the information obtained by the measurement device mounted on the measurement vehicle, but may be information obtained by a measurement device mounted on another mobile body such as an aircraft and a drone. In this case, the moving trace information is information expressing a trace of positions along which the mobile body has moved.

(Step S12 of FIG. 5: Graphics Process)

The graphics unit 112 of the map generation device 10 generates linearization information expressing an edge portion of a roadway, based on the measured information acquired in step S11. Specifically, the graphics unit 112 generates, as the linearization information expressing the edge portion of the roadway, linearization information expressing at least one or the other of a marking line of the roadway and a road shoulder edge. The graphics unit 112 writes the linearization information to the primary map storage device 40.

(Step S13 of FIG. 5: Evaluation Process)

The evaluation unit 113 of the map generation device 10 calculates an evaluation value expressing a reliability degree of position information of the partial information, by each partial information constituting the linearization information generated in step S12. The evaluation unit 113 writes the evaluation value to the primary map storage device 40 as being associated with the linearization information.

The partial information is provided by dividing the linearization information at every branching point and every merging point of the roadway. Alternatively, the partial information is provided by dividing the linearization information at every predetermined distance (for example, every several meters to every several 100 meters). The reliability degree signifies certainty of a position of the partial information.

(Step S14 of FIG. 5: Display Process) The display unit 211 of the map editing device 20 acquires the linearization information and the evaluation value which are stored in the primary map storage device 40. The display unit 211 displays the partial information in different modes according to the evaluation value onto the display device 26 connected via the communication interface 24, thereby displaying the linearization information.

Specifically, the display unit 211 displays partial information whose reliability degree expressed by the evaluation value is lower than a threshold, in a display mode different from the other partial information. For example, the display unit 211 displays partial information having a reliability degree lower than the threshold, in a color or line type different from the other partial information.

(Step S15 of FIG. 5: Editing Process)

The editing unit 212 of the map editing device 20 accepts input of the editing information for the linearization information displayed in step S14. The editing unit 212 edits the linearization information in accordance with the editing information. The editing unit 212 writes the edited linearization information to the secondary map storage device 50.

Specifically, the editing unit 212 accepts the editing information which is inputted by the user operating the input device 25. Each time editing information is accepted, the editing unit 212 edits the linearization information in accordance with the editing information. When the user operates the input device 25 and inputs edit end, the editing unit 212 writes the edited linearization information to the secondary map storage device 50.

The graphics process (step S12 of FIG. 5) according to Embodiment 1 will be described with referring to FIGS. 6 to 16.

Figure 6:
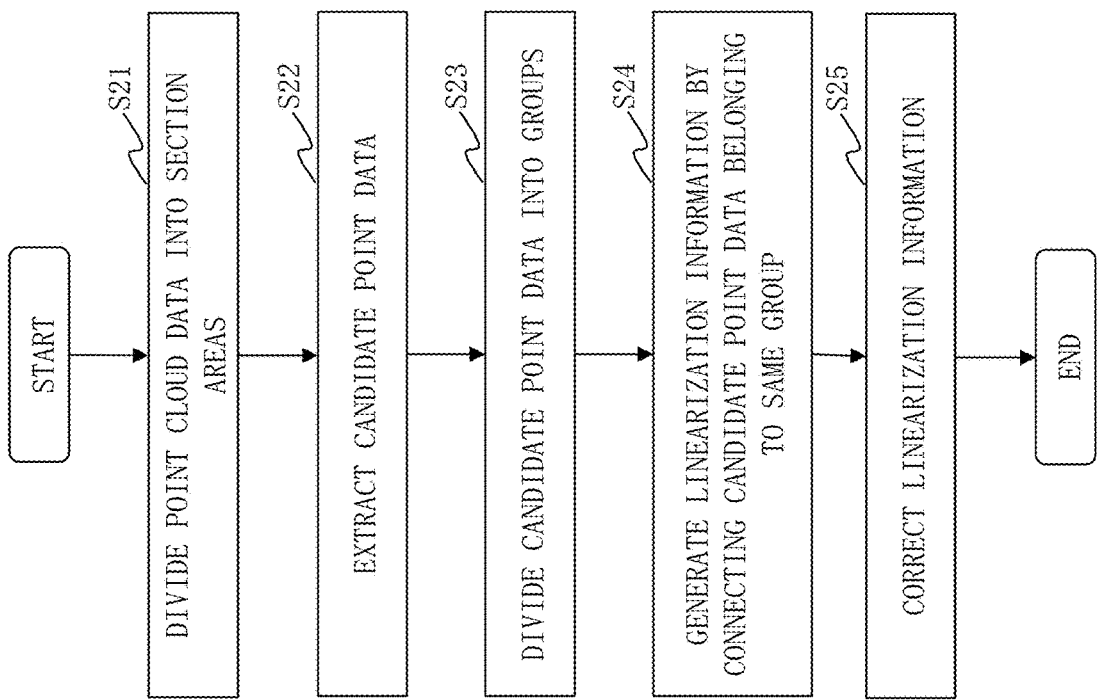
FIG. 6 is a flowchart of graphics processing according to Embodiment 1.

(Step S21 of FIG. 6: Division Process)

The candidate point extraction unit 114 divides the point cloud data included in the measured information into a plurality of plate-like section areas perpendicular to an advancing direction of the measurement vehicle. The advancing direction of the measurement vehicle can be identified from the trace indicated by the moving trace information. The moving trace information is formed of, for example, position information of the measurement vehicle taken at every 0.1 second.

Specifically, the candidate point extraction unit 114 sets the plurality of plate-like section areas perpendicular to the advancing direction of the measurement vehicle. The candidate point extraction unit 114 performs spatial search on each section area as a target, thereby identifying the point cloud data included in the target section area.

There is a case where the laser radar performs measurement while rotating in a direction perpendicular to the advancing direction of the measurement vehicle. In this case, a range measured by one turn of the laser radar may be defined as one section area, and data corresponding to one turn may be handled as data of one section area. In that case, since the measurement vehicle advances while the laser radar rotates through one turn, data corresponding to one turn is not data of a section in a strict sense, but is helical data. With MMS, spatial information is acquired by a laser radar that rotates its measurement direction on a certain axis. In a case where data of one turn is to be utilized as data of one section area, assuming that the laser radar rotates by 100 turns per second and that the laser radar acquires 200,000 pieces of point data per second, one section area includes 2,000 pieces of point cloud data.

The candidate point extraction unit 114 may set a section area at every predetermined spacing in the advancing direction of the measurement vehicle. That is, predetermined spacing may be reserved between the section areas. Then, when a data quantity of point cloud data included in the measured information is larger than is necessary, the data quantity to be processed can be reduced, and delay of the process can be suppressed.

(Step S22 of FIG. 6: Candidate Point Extraction Process)

The candidate point extraction unit 114, taking each section area obtained by division in step S21 as a target, extracts a plurality of pieces of point data that are likely to indicate an edge portion of a roadway, as candidate point data from point cloud data of a section area being target. Specifically, the candidate point extraction unit 114 extracts point data that are likely to indicate at least one or the other of a road shoulder edge and a marking line each indicating an edge portion of a roadway, as the candidate point data.

Figure 7:
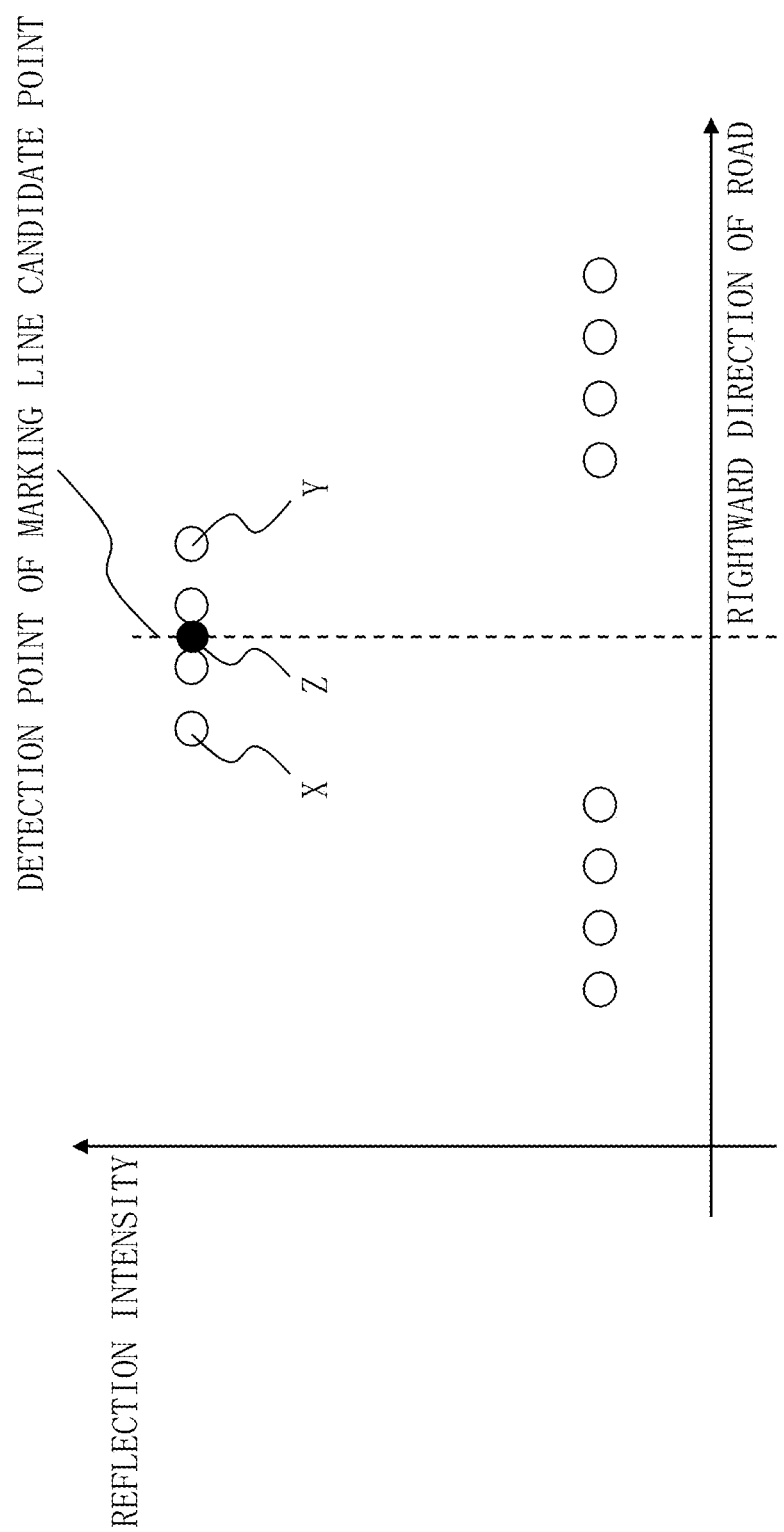
FIG. 7 is an explanatory diagram according to Embodiment 1 of a process of identifying point data expressing a marking line.

When identifying point data expressing a marking line, the candidate point extraction unit 114 identifies a location where a reflection intensity changes in the point data on a road surface, as a range of the marking line. When the point data is acquired by a measurement device such as a laser radar, the point data has a position of a reflection point and a reflection intensity of reflection at the reflection point. As illustrated in FIG. 7, the candidate point extraction unit 114 identifies point data of a barycentric portion at a location where the reflection intensity is higher than at a surrounding portion by a predetermined value or more, as point data that is likely to express a marking line. Point data on the road surface can be identified from a height of the point data.

In FIG. 7, an axis of ordinate represents the reflection intensity of point data, and an axis of abscissa represents a rightward direction of a road in the section area. A rightward direction of a road is a direction that is perpendicular to both a vehicle advancing direction and a vertically upward direction. A rightward direction of a road is a direction toward a right side of the vehicle advancing direction, in a plus direction. A coordinate origin may be set anywhere. In Embodiment 1, the axis of ordinate has an origin position at 0 $[W/sr/m^2]$, and the axis of abscissa has an origin position at a position of point data which is included in point cloud data within a plane and which is in the rightward direction of the road and has the smallest coordinate value.

The candidate point extraction unit 114 checks the reflection intensity sequentially, starting with, from among the point data included in the point cloud data, point data which is in the rightward direction of the road and which has a small coordinate value. The candidate point extraction unit 114 identifies point data at which the reflection intensity increases sharply, that is, point data X at which a difference in reflection intensity from immediately preceding point data is larger than a predetermined value (for example, a preset value of a reflection intensity change of a reflection beam of a laser beam). The candidate point extraction unit 114 also identifies point data at which the reflection intensity decreases sharply, that is, point data Y at which a difference in reflection intensity from next point data is larger than the predetermined value. If a point-to-point width between the point data X and the point data Y falls within a designated range of a lower limit width and an upper limit width, the candidate point extraction unit 114 identifies candidate point data Z by treating barycentric positions of a plurality of pieces of point data having large reflection intensities, that is, barycentric positions of a plurality of pieces of point data ranging from the point data X to the point data Y, as candidate elements of a marking line. If point data exists at a barycentric position, this point data is treated as candidate point data. If point data does not exist at a barycentric position, new point data is generated as candidate point data. Alternatively, if the point-to-point width between the point data X and the point Y falls within the designated range of the lower limit width and the upper limit width, a central position between the point data X and the point data Y may be treated as candidate point data of the marking line.

Hence, a sequence of points of candidate point data of a marking line which line up on the marking line in a vehicle advancing direction is identified.

Figure 8:
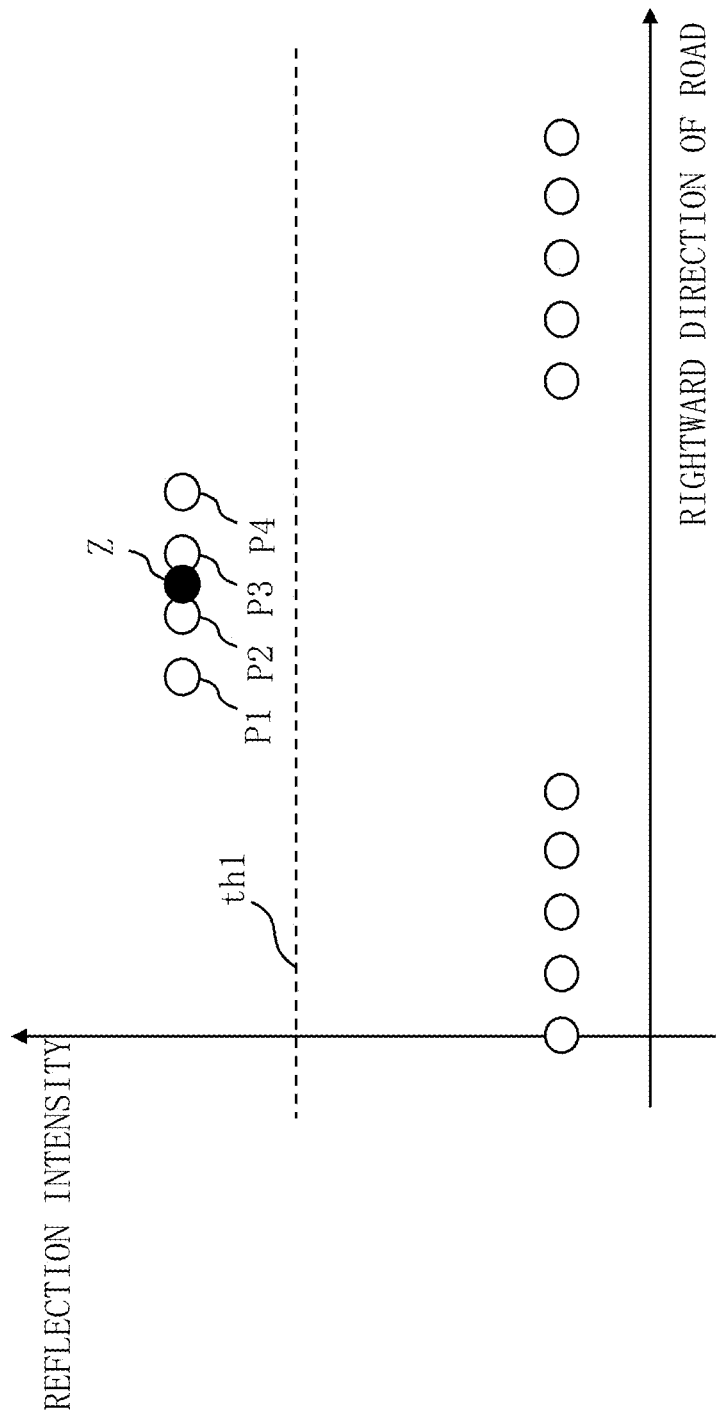
FIG. 8 is an explanatory diagram of a process according to Embodiment 1 of identifying point data expressing a marking line.

A method of identifying candidate point data of a marking line is not limited to the method described above in which a difference in reflection intensity from adjacent point data is used. For example, as illustrated in FIG. 8, assume that a threshold th1 is set in advance for the reflection intensity; point data P1, point data P2, point data P3, and point data P4 included in point cloud data and exceeding the threshold th1 are extracted; and the plurality of pieces of extracted point data are determined to fall within a range of the marking line. If a width of the range of the marking line is within the designated range of the upper and lower limit widths, barycentric positions of the point data P1, point data P2, point data P3, and point data P4 may be treated as candidate point data Z of the marking line.

Figure 9:
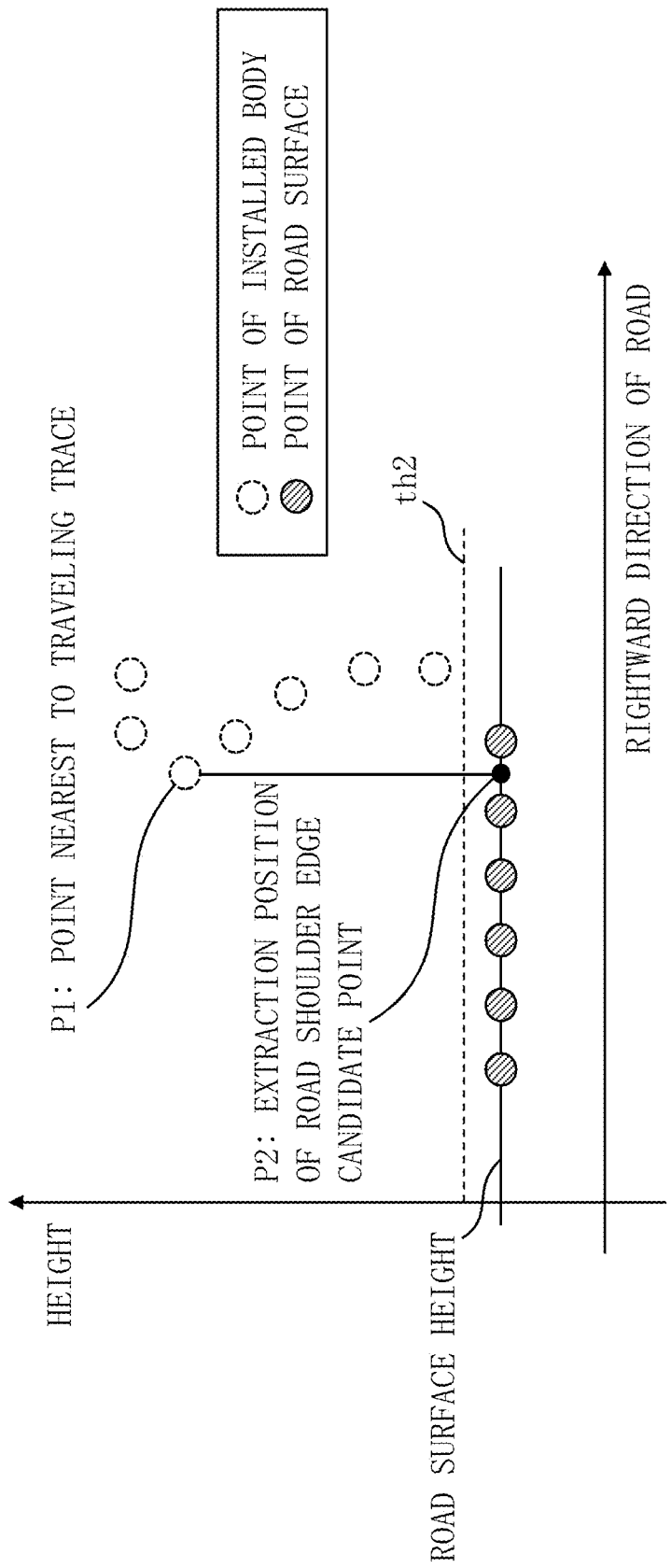
FIG. 9 is an explanatory diagram of a process according to Embodiment 1 of identifying point data expressing a road shoulder edge.

When identifying point data expressing a road shoulder edge, the candidate point extraction unit 114 classifies point cloud data into point data on a road surface and point data of an installed body based on a height of the point data, as illustrated in FIG. 9. The candidate point extraction unit 114 identifies point data the nearest to the trace indicated by the moving trace information among the installed body point data, as point data which is likely to express a road shoulder edge. FIG. 9 is directed to a case where there is an installed body such as a guide rail.

In FIG. 9, an axis of ordinate represents a direction of height in a section area, that is, a vertically upward direction, and an axis of abscissa represents a rightward direction of the road on the section area. A coordinate origin may be set anywhere. In Embodiment 1, the axis of ordinate has an origin position at a position of point data which is included in the point cloud data within a plane and which is located at the lowest position, and the axis of abscissa has an origin position at a position of point data which is included in the point cloud data within the plane and which is in the rightward direction of the road and has the smallest coordinate value.

First, the candidate point extraction unit 114 classifies the point cloud data into point data on the road and point data of a feature other than the road, such as a curb and an installed object. This classification is conducted by setting a threshold th2 in advance for the direction of height, and by treating point data less than the threshold th2 as point data of a road and point data equal to or more than the threshold th2 as point data of other than the road. Then, the candidate point extraction unit 114 extracts point data the nearest to the trace indicated by the moving trace information, from among the point data classified under the point data of other than the road. Although not illustrated in the example of FIG. 9, the trace is located on the left side of the origin. Thus, the point data P1 is extracted as the point data the nearest to the trace. Furthermore, the candidate point extraction unit 114 identifies a position of a foot of a perpendicular drawn to a road surface from a position of the extracted point data P1, as candidate point data P2 of a road shoulder edge. The road surface may be set in advance just as the threshold th2 is. Alternatively, an approximate plane may be generated from a plurality of pieces of point data which are less than the threshold th2 and which are judged as point data on the road, and the generated plane may be determined as the road surface.

A road shoulder edge is a boundary indicating an end of a road. Road shoulder edges used as map information are set only one on the right of the vehicle advancing direction and only one on the left of the vehicle advancing direction. Therefore, the candidate point extraction unit 114 identifies candidate point data on a road shoulder edge in one section area, only one piece on the right side of the vehicle traveling trace and only one piece on the left side of the vehicle traveling trace.

Hence, a sequence of points of candidate point data of a road shoulder edge which line up in a vehicle advancing direction is identified.

Figure 10:
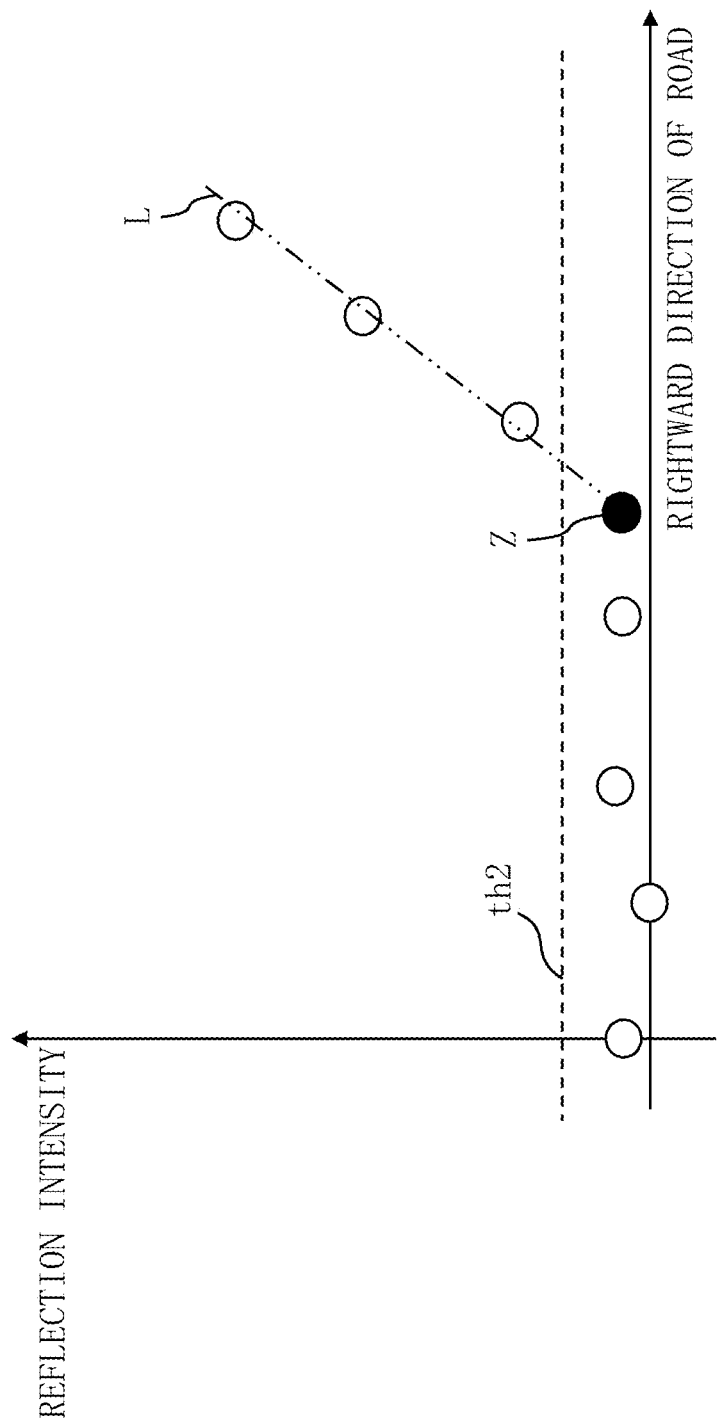
FIG. 10 is an explanatory diagram according to Embodiment 1 of a process of identifying point data expressing a road shoulder edge.

A method of identifying candidate point data of a road shoulder edge is not limited to the method described above. For example, coordinate values in the direction of height of the point data may be checked sequentially, starting with, from among the point data included in the point cloud data, point data which is in the rightward direction of the road and which has a small coordinate value. Point data at which the coordinate value decreases sharply and a point at which the coordinate value increases sharply may be extracted, and the extracted point data and the extracted point may be treated as candidate point data of the road shoulder edge. Also, as illustrated in FIG. 10, when a portion of the road on the outer side of the road shoulder forms an inclination such as a bank and furthermore the point cloud data are coarse, an approximate straight line L may be generated based on a plurality of pieces of point data at which the height changes sharply, and an intersection of this straight line and the road surface may be determined as candidate point data Z of the road shoulder edge.

(Step S23 of FIG. 6: Grouping Process)

The candidate point connection unit 115 divides the candidate point data extracted from each section area into groups each consisting of candidate point data expressing the same marking line or the same road shoulder edge.

Grouping of marking lines will be described.

The candidate point connection unit 115 performs grouping on the candidate point data according to a position. The candidate point connection unit 115 performs grouping on the candidate point data considering both of a distance from the candidate point data to a trace expressed by the moving trace information, and a distance between individual pieces of candidate point data. More precisely, the candidate point connection unit 115 performs grouping such that two target pieces of candidate point data form the same group if a difference is small in distance from the two target pieces of candidate point data to the trace and if the two target pieces of candidate point data are at a small distance from each other. In other words, the more parallel the direction in which the pieces of candidate point data are separate apart from each other is to the trace, the smaller the value the candidate point connection unit 115 multiplies to the distance between the pieces of candidate point data. The more perpendicular the direction in which the pieces of candidate point data are separate from each other is to the trace, the larger the value the candidate point connection unit 115 multiplies to the distance between the pieces of candidate point data. Then, the candidate point connection unit 115 puts pieces of candidate point data whose weighted distances are equal to or less than a reference value, into the same group.

Figure 11:
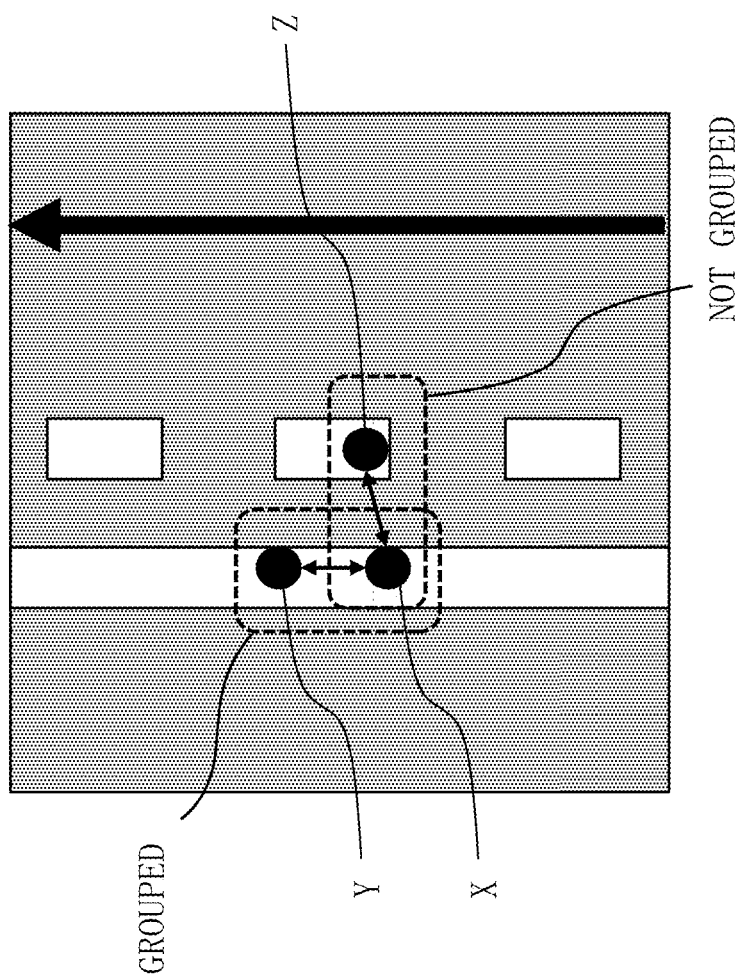
FIG. 11 is an explanatory diagram of a grouping process according to Embodiment 1.

For example, assume that there are candidate point data X, Y, and Z, as illustrated in FIG. 11. A distance between the candidate point data X and the candidate point data Y and a distance between the candidate point data X and the candidate point data Z are almost the same. However, while the two pieces of candidate point data X and Y located on a same white line are at almost the same distance to a trace, the candidate point data X and the candidate point data Z that are located on different white lines are at different distances to the trace. Therefore, the candidate point data X and the candidate point data Y tend to be put into the same group, while the candidate point data X and the candidate point data Z do not tend to be put into the same group. Note that pieces of candidate point data that are distant from each other do not tend to be put into the same group even if there is almost no difference between distances from the individual pieces of candidate point data to the trace.

As a result, a group not including a disturbance factor such as dirt on a road surface and a line different from a marking line can be formed.

A trace is a sequence of points expressing positions of a vehicle at time points. Hence, actually, a distance between each candidate point data of a marking line and each point included in the sequence of points of the trace is calculated, and a distance between each candidate point data and the nearest point data of the trace is determined as a distance between the coordinate point data of the marking line and the trace. When the trace is to be treated not as a sequence of points but as a curve, a perpendicular may be drawn from each candidate point data to the curve, and a length of the perpendicular may be calculated as the distance between the candidate point data of the marking line and the trace.

Marking line grouping is not limited to the method described above. Regarding two pieces of candidate point data, a difference between distances from the individual pieces of candidate point data to the trace will not be calculated. Pieces of candidate point data whose distances in absolute value to the trace fall within a predetermined range may be put into the same group.

Road shoulder edge grouping will be described.

When linearization information of a sequence of constituent points constituting a road shoulder edge is to be generated, the candidate point connection unit 115 divides a group only when the distance to the trace changes largely, and otherwise performs grouping in accordance with whether the sequence of constituent points is on the left side or the right side of the measurement vehicle.

Measurement using a laser scanner mounted on an MMS cannot sometimes measure point cloud data accurately due to influences of vegetation and a parallel traveling car. If grouping is performed by the above method with using candidate point data obtained from such point cloud data that was not measured accurately, every single candidate point data is only put into one or the other of two groups by distinguishing it in accordance with whether it located on the left side or the right side of the trace. Accordingly, there is a possibility that a non-smooth road shoulder edge which is largely uneven in a right-left direction, that is, a road shoulder edge deviating from a shape of an actual road shoulder edge is generated. For this reason, detection of a segment where candidate point data arrangement represents large unevenness in the right-left direction may be judged as an erroneous detection, and a piece of candidate point data included in the segment judged as the erroneous detection may be excluded from the candidate point data.

The candidate point connection unit 115 performs comparison between the candidate point data group and the trace. Specifically, the candidate point connection unit 115 calculates a distance from each candidate point data in the group to the trace, and extracts point data whose distance to the trace differs from a distance from adjacent candidate point data to the trace, by a value equal to or more than a predetermined threshold. By this, a portion is detected where point cloud data cannot be acquired accurately by the laser due to the influences of the vegetation and a parallel traveling car and where there is candidate point data that is likely to generate a road shoulder edge deviating from the shape of the actual road shoulder edge. Then, the detected candidate point data is excluded, so that candidate point data corresponding to the traveling trace can be selected.

As a result, candidate point data to be used for generation of a boundary can be selected by excluding a disturbance factor such as dirt on the road surface.

Figure 12:
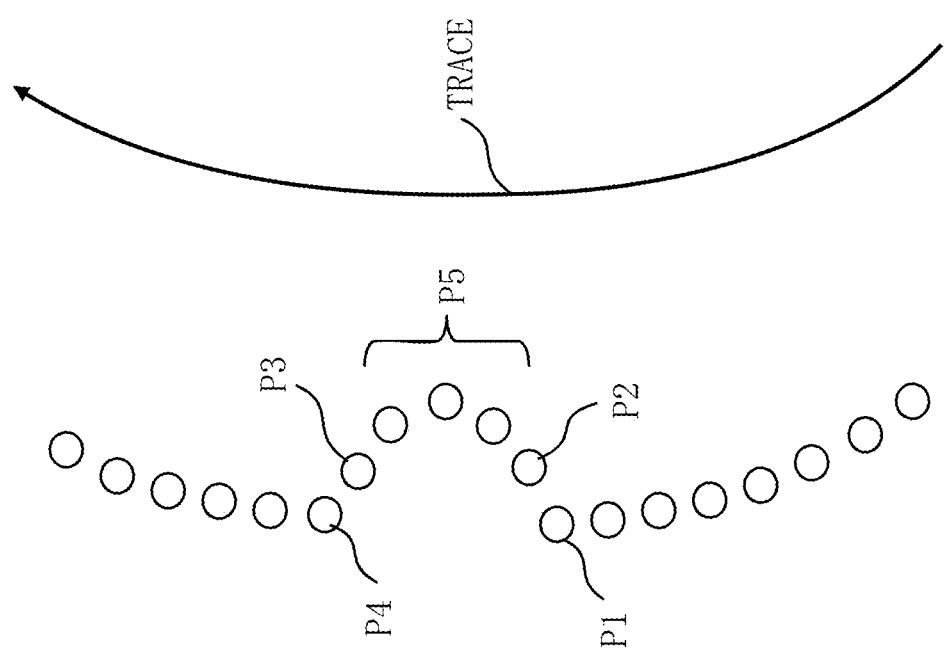
FIG. 12 is an explanatory diagram according to Embodiment 1 of a process of excluding candidate point data.

The above method will be specifically described with referring to FIG. 12.

Point data included in the point cloud data contains information of a measurement time point. Thus, the candidate point connection unit 115 studies the distance from each candidate point data to the trace sequentially, starting with point data of an early measurement time point to point data of a later measurement time point. Then, the candidate point connection unit 115 identifies point data at which the distance to the trace changes sharply. That is, the candidate point connection unit 115 identifies candidate point data P1 at which the distance to the trace starts to decrease sharply down to the distance between the next candidate point data P2 and the trace, and identifies candidate point data P4 until which the distance to the trace increases sharply from the distance between the preceding candidate point data P3 and the trace. The candidate point data P1 and the candidate point data P4 form ends of accurately identified candidate point data. The candidate point data P2 and the candidate point data P3, and a plurality of pieces of candidate point data P5 existing between the candidate point data P2 and the candidate point data P3 are erroneously detected. Hence, the candidate point data P2 and the candidate point data P3, and the plurality of pieces of candidate point data P5 are excluded from candidate point data used for generating point information of the road shoulder edge.

(Step S24 of FIG. 6: Candidate Point Connection Process)

The candidate point connection unit 115 treats candidate point data belonging to the same group as nodes, and connects the nodes with links in the advancing direction of the measurement vehicle, thereby generating linearization information of the sequence of constituent points constituting at least one or the other of a marking line and a road shoulder line.

Specifically, the candidate point connection unit 115 connects, with links, nodes which are pieces of candidate point data near to each other, among candidate point data belonging to the same group. In this case, the more parallel to the trace the direction in which the candidate point data are separate apart from each other is, the smaller the value the candidate point connection unit 115 multiplies to the distance between the candidate point data. The more perpendicular to the trace the direction in which the candidate point data are separated apart from each other is, the larger the value the candidate point connection unit 115 multiplies to the distance between the candidate point data. Then, the candidate point connection unit 115 connects a node sequentially, starting with a node of candidate point data in a section area on a front side in the advancing direction of the measurement vehicle, to a node of candidate point data whose weighted distance is equal to or less the threshold. As nodes of the candidate point data equal to or less than the threshold are connected with links, there is a possibility that linearization information which is partially discontinuous is generated.

Figure 13:
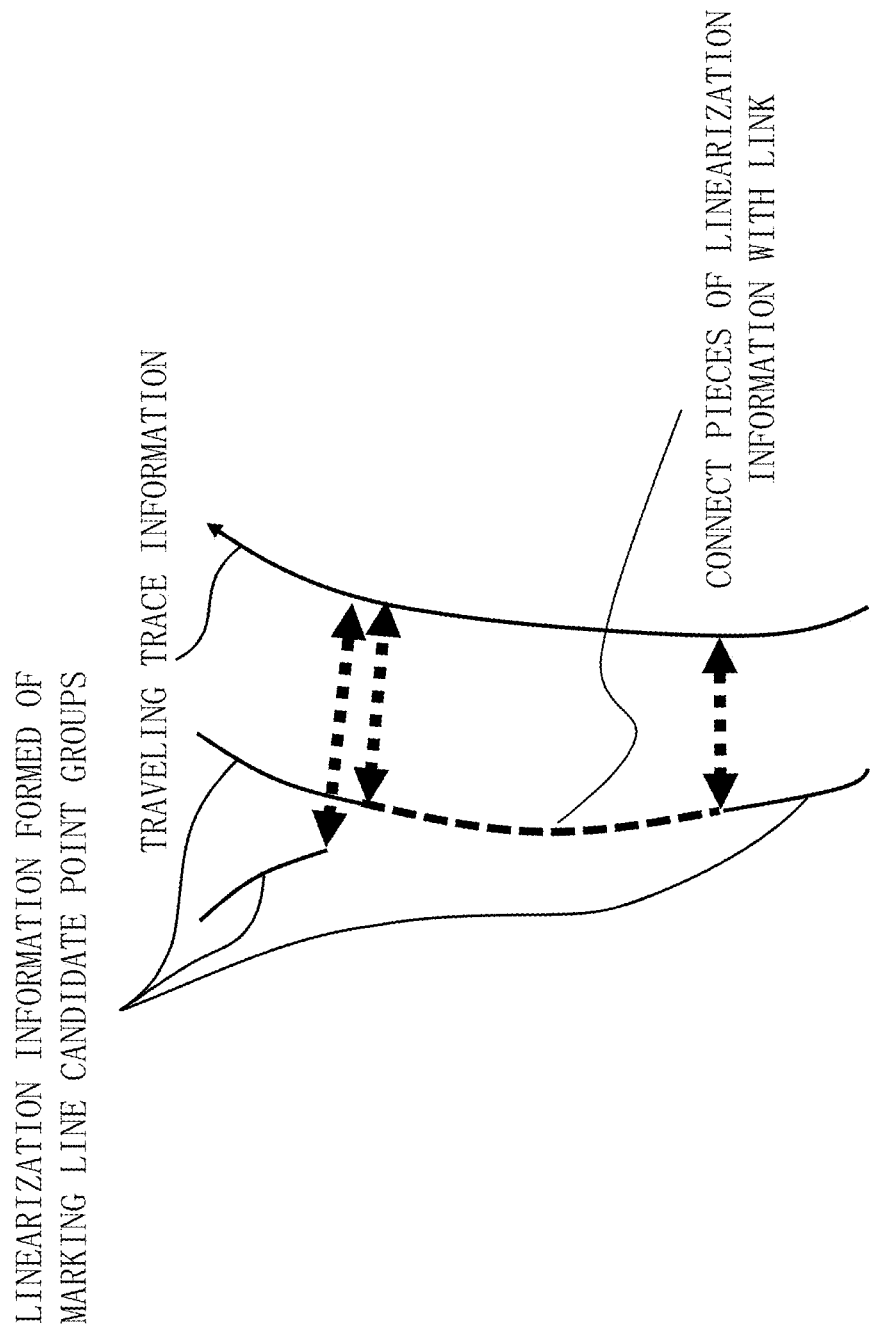
FIG. 13 is an explanatory diagram according to Embodiment 1 of a process of connecting groups.

Furthermore, the candidate point connection unit 115 may connect pieces of linearization information generated from different groups. For example, as illustrated in FIG. 13, the candidate point connection unit 115 connects pieces of linearization information whose positional relationships with the trace are similar, with links parallel to the trace or with links which are near to-parallel to the trace. Hence, even when the roadway curves, linearization information reflecting the curve of the roadway can be generated.

Specifically, the candidate point connection unit 115 calculates barycentric positions of candidate point data included in the group, and calculates a distance between a barycenter of one group and candidate point data included in another group. The candidate point connection unit 115 extracts several pieces of candidate point data sequentially, starting with candidate point data whose distance to the barycenter is small. The candidate point connection unit 115 then inverses the role relationship between the groups, and extracts several pieces of candidate point data from the other group. Then, the candidate point connection unit 115 calculates barycentric positions of the plurality of extracted candidate points of each group, and calculates a distance between barycenters. If the distance between the barycenters of two groups is within a predetermined range, the candidate point connection unit 115 connects the two groups.

Figure 14:
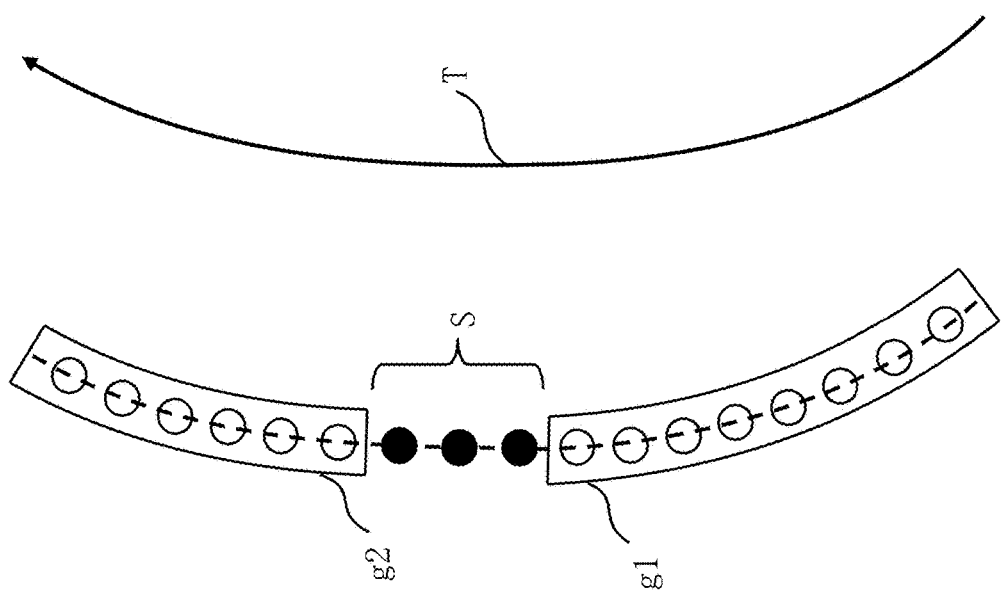
FIG. 14 is an explanatory diagram according to Embodiment 1 of a process of connecting groups.

The above method will be specifically described with referring to FIG. 14.

A group g1 and group g2 of a marking line are connected with using a trace T. If the group g1 and the group g2 are within a range of a predetermined distance, a plurality of pieces of candidate point data S are generated to connect the two groups. The plurality of pieces of candidate point data S are generated such that an approximate curve formed of the group g1 and the group g2, and the plurality of pieces of candidate point data S is similar to the trace T.

A trace is a sequence of points expressing positions of the measurement vehicle. Hence, the candidate point connection unit 115 generates the approximate curve from the sequence of points expressing the trace, and connects the two groups such that the approximate curve becomes similar to an approximate curve formed of the two groups and the newly generated candidate point data. However, a method of connecting the two groups is not limited to the method described above. The groups may be connected without generating an approximate curve but by using only a positional relationship of a sequence of points expressing a trace. For example, new candidate point data may be generated such that an angle formed by connecting points of a sequence of points expressing a trace with straight lines becomes the same as an angle formed by connecting pieces of candidate point data generated between the two groups with straight lines. Then, the groups may be connected.

(Step S25 of FIG. 6: Correction Process)

The correction unit 116 corrects the linearization information generated in step S24 to generate highly reliable linearization information. Specifically, the correction unit 116 performs the following three corrections of Correction 1 to Correction 3. The correction unit 116 writes the corrected linearization information to the primary map storage device 40.

Figure 15:
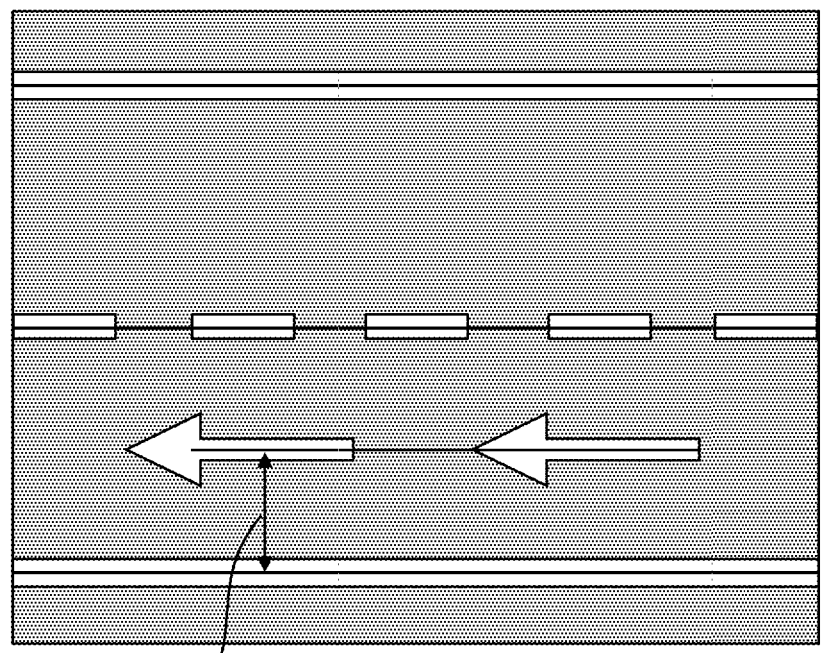
FIG. 15 is an explanatory diagram of Correction 1 according to Embodiment 1.

As illustrated in FIG. 15, there is a possibility that linearization information is generated with using, as a marking line, road surface signs appearing consecutively parallel to the trace. Such linearization information is an error and is thus corrected.

(Correction 1) The correction unit 116 treats, as a target, linearization information having a length equal to or less than a first reference distance (for example, 10 m) among the linearization information generated by the coordinate point connection unit. If another linearization information longer than the linearization information being the target exists on an opposite side of the trace, the correction unit 116 deletes the linearization information being the target. That is, the correction unit 116 considers the linearization information not as a marking line but as a road surface sign and deletes the linearization information, if another long linearization information exists on the opposite side of the trace.

In step S23, when linearization information of a sequence of constituent points constituting a road shoulder edge is to be generated, the candidate point connection unit 115 divides a group only when the distance of the sequence of constituent points to the trace changes largely, and otherwise performs grouping in accordance with whether the sequence of constituent points is on the left side or the right side of the measurement vehicle. Hence, there is a possibility that linearization information expressing a road shoulder edge forms linearization information including non-uniformities or discontinuous linearization information. Such linearization information may be erroneously detected due to vegetation or a parallel traveling vehicle, so it is corrected. Even if a process is executed in step S23 to exclude a piece of candidate point data included in a segment judged as an erroneous detection, from the candidate point data, there still remains a possibility that linearization information has been generated from erroneously detected candidate point data. In view of this, more reliable linearization information can be generated by executing the following Corrections 2 and 3.

Figure 16:
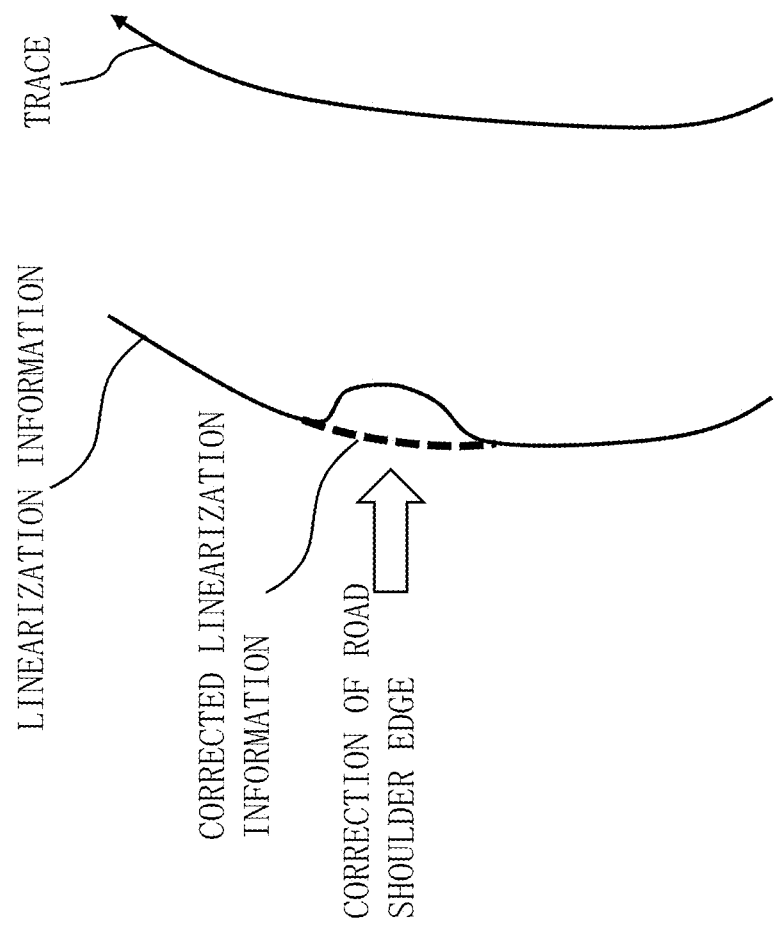
FIG. 16 is an explanatory diagram of Correction 2 according to Embodiment 1.

(Correction 2) The correction unit 116 treats segment information constituting part of the linearization information, as a target. If the segment information being the target is nearer to the trace than another adjacent segment information located before the segment information being the target and than another adjacent segment information located after the segment information being the target, by a second reference distance (for example, 2 m) or more, the correction unit 116 deletes the segment information being the target. That is, if some segment of the linearization information temporarily moves toward the trace by the second reference distance or more and then returns to near the initial position, the correction unit 116 deletes this segment by judging it as a shield segment influenced by shielding of a parallel traveling car. In this case, as illustrated in FIG. 16, the correction unit 116 connects the segment information located before the deleted segment information and the segment information located after the deleted segment information in an advancing direction of the measurement vehicle, with a link parallel to the trace, thereby regenerating the deleted segment information.

Figure 17:
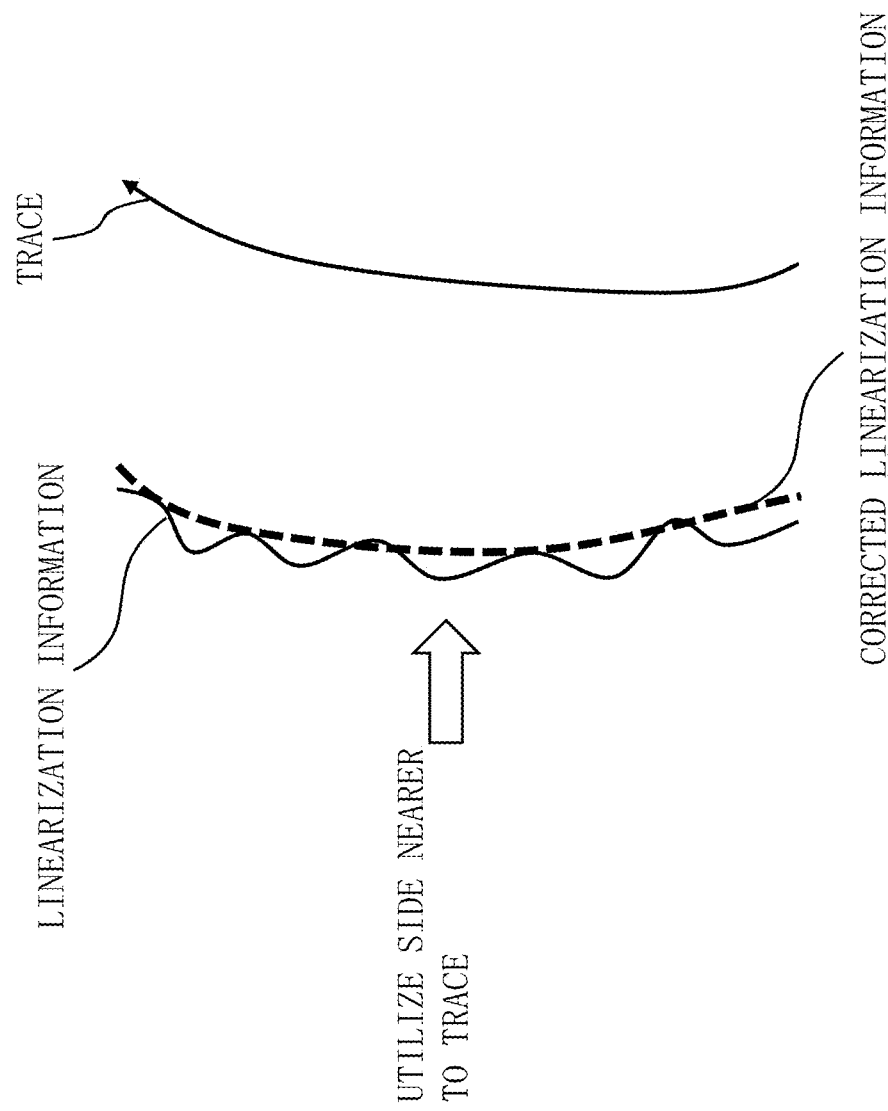
FIG. 17 is an explanatory diagram of Correction 3 according to Embodiment 1.

(Correction 3) The correction unit 116 treats segment information constituting part of the linearization information and located at about every 10 meters, as a target. If an average distance between the segment information being the target and an approximate curve, which is obtained by cubic-function approximating point data constituting the segment information being the target, is equal to or more than a third reference distance, the correction unit 116 deletes the segment information being the target. That is, if some segment of the linearization information includes non-uniformities exceeding the reference, the correction unit 116 deletes this segment by judging it as being influenced by vegetation or the like. Namely, almost any ordinary road shoulder edge can be expressed by a cubic function. Therefore, if a difference from the approximate curve obtained by cubic-function approximation is large, it can be judged that this segment is influenced by the vegetation or the like. In this case, as illustrated in FIG. 17, the correction unit 116 connects only point data near to the trace and constituting the deleted segment information, with links, thereby regenerating the deleted segment information. By connecting only the point data near to the trace with the links, the road shoulder edge is moved nearer to the center of the roadway. If the road shoulder edge indicated by the linearization information is located on the outer side than the actual road shoulder edge, the vehicle is likely to come into contact with the road shoulder edge. However, as the road shoulder edge indicated by the linearization information moves nearer to the center of the roadway, the possibility that the vehicle comes into contact with the road shoulder edge when the vehicle is driven based on this linearization information, can be decreased.

The evaluation process (step S13 of FIG. 5) according to Embodiment 1 will be described with referring to FIGS. 18 to 20.

A case wherein linearization information represents a marking line will be described with referring to FIG. 18.

Figure 18:
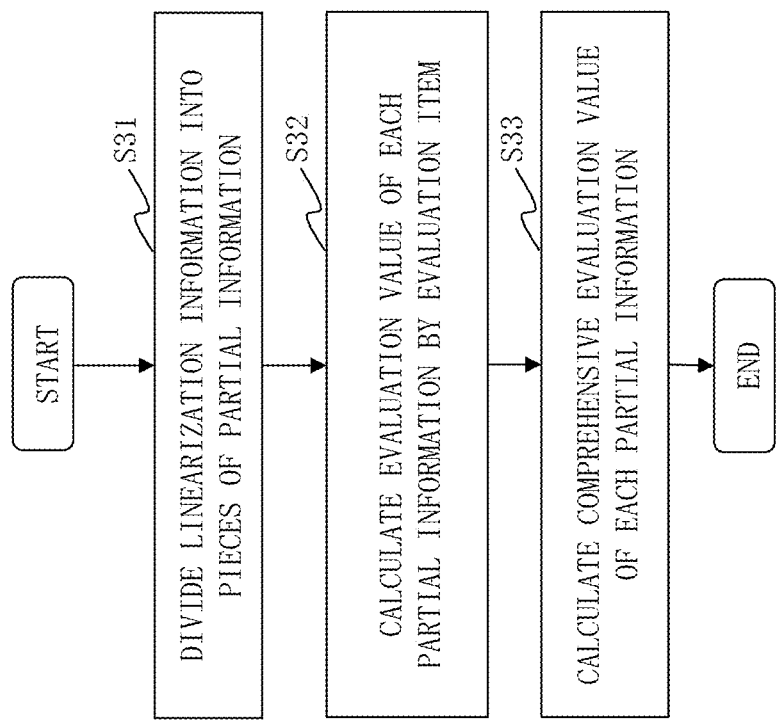
FIG. 18 is a flowchart according to Embodiment 1 of an evaluation process of a case where linearization information expresses a marking line.
Figure 19:
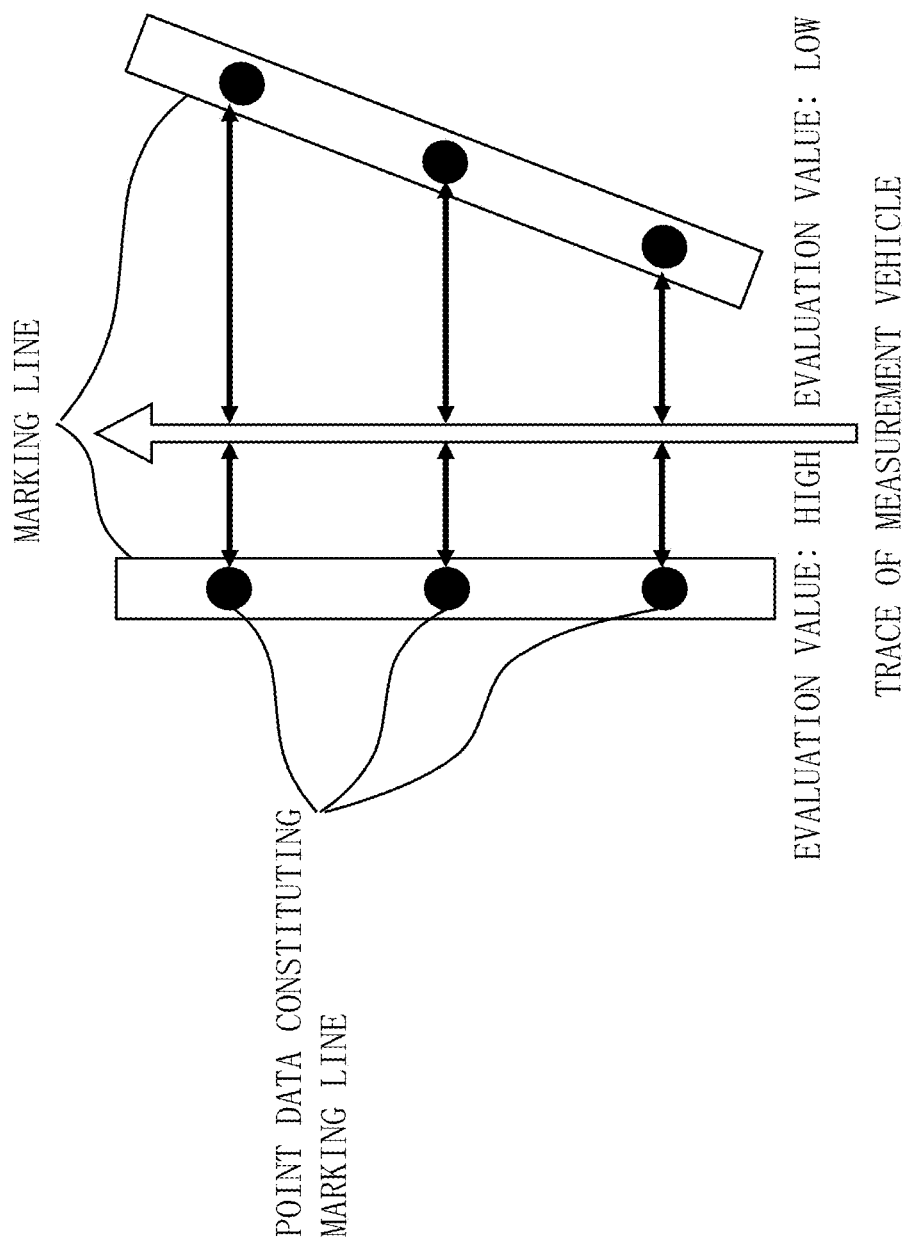
FIG. 19 is an explanatory diagram according to Embodiment 1 of a process of a parallel degree evaluation unit 82.

(Step S31 of FIG. 18: Division Process)

The marking line evaluation unit 113a divides the linearization information into pieces of partial information constituting the linearization information.

(Step S32 of FIG. 18: Individual Evaluation Process)

The marking line evaluation unit 113a calculates an evaluation value expressing a reliability degree of a position of a marking line indicated by each partial information.

Specifically, the reflection intensity change quantity evaluation unit 81, the parallel degree evaluation unit 82, the function approximation error quantity evaluation unit 83, and the measurement condition evaluation unit 84 calculate the valuation value expressing the reliability degree of the position of the marking line indicated by the partial information, by a method to be described below.

The reflection intensity change quantity evaluation unit 81 finds a reflection intensity change quantity (see FIG. 7) which is a difference between a reflection intensity of a portion extracted as the marking line and a reflection intensity of a portion around the extracted portion, and evaluates a magnitude of the reflection intensity change quantity. If the reflection intensity change quantity is large, it may indicate that a definite position of the marking line has been acquired. Therefore, the larger the reflection intensity change quantity, the more highly the reflection intensity change quantity evaluation unit 81 raises the evaluation value of the position information of the marking line.

In the above discussion, a difference between the reflection intensity of the portion extracted as the marking line and the reflection intensity of a portion around the extracted portion is determined as an evaluation item. Alternatively, an absolute value of the reflection intensity of the portion extracted as the marking line may be determined as the evaluation item.

The parallel degree evaluation unit 82 evaluates the parallel degree between a direction of a row of marking line constituent points and the moving trace of the measurement vehicle. When, as illustrated in FIG. 19, the row of the marking line constituent points is not parallel to the moving trace of the measurement vehicle, it is likely that a stop line or another road surface sign, and the like have been erroneously detected as a marking line. Hence, the parallel degree evaluation unit 82 lowers the evaluation value of the position information of the marking line.

The function approximation error quantity evaluation unit 83 evaluates a magnitude of an error quantity sum of when the row of the marking line constituting points is cubic-function approximated by the least square. The error quantity represents the degree of linear non-uniformities. Therefore, the smaller the error quantity sum is, the more highly the function approximation error quantity evaluation unit 83 raises the evaluation value of the position information of the marking line. The method for approximation is not limited to cubic-function approximation.

The measurement condition evaluation unit 84 finds the evaluation value of the position information of the marking line from a distance between a position of the measurement vehicle at the time the measurement device has acquired measured information used for estimation of a marking line, and points constituting the marking line, and from the weather at the time the measurement device has acquired the measured information used for estimation of the marking line. For example, if the marking line constituent points are far from the measurement vehicle, the data density becomes low and the data reliability degree decreases. Therefore, the farther the marking line constituent points are from the measurement vehicle, the more the measurement condition evaluation unit 84 lowers the evaluation value of the position information of the marking line. In a bad weather such as rain, the reliability degree of the data acquired by the measurement device decreases. Therefore, the worse the weather is at the time the measured information is acquired, the more the measurement condition evaluation unit 84 lowers the evaluation value of the position information of the marking line.

(Step S33 of FIG. 18: Comprehensive Evaluation Process)

The marking line evaluation unit 113a calculates the evaluation value of the partial information by putting together the evaluation values calculated by the reflection intensity change quantity evaluation unit 81, the parallel degree evaluation unit 82, the function approximation error quantity evaluation unit 83, and the measurement condition evaluation unit 84 in step S32. According to a specific example, the marking line evaluation unit 113a weights the evaluation values calculated by the reflection intensity change quantity evaluation unit 81, the parallel degree evaluation unit 82, the function approximation error quantity evaluation unit 83, and the measurement condition evaluation unit 84, and adds up the weighted values, thereby calculating the evaluation value of the partial information.

The marking line evaluation unit 113a writes the evaluation value of the partial information to the primary map storage device 40 to correspond to the partial information. The marking line evaluation unit 113a may also write the evaluation values calculated individually by the reflection intensity change quantity evaluation unit 81, the parallel degree evaluation unit 82, the function approximation error quantity evaluation unit 83, and the measurement condition evaluation unit 84 to the primary map storage device 40 to correspond to the partial information.

A case wherein the linearization information indicates a road shoulder edge will be described with referring to FIG. 20.

Figure 20:
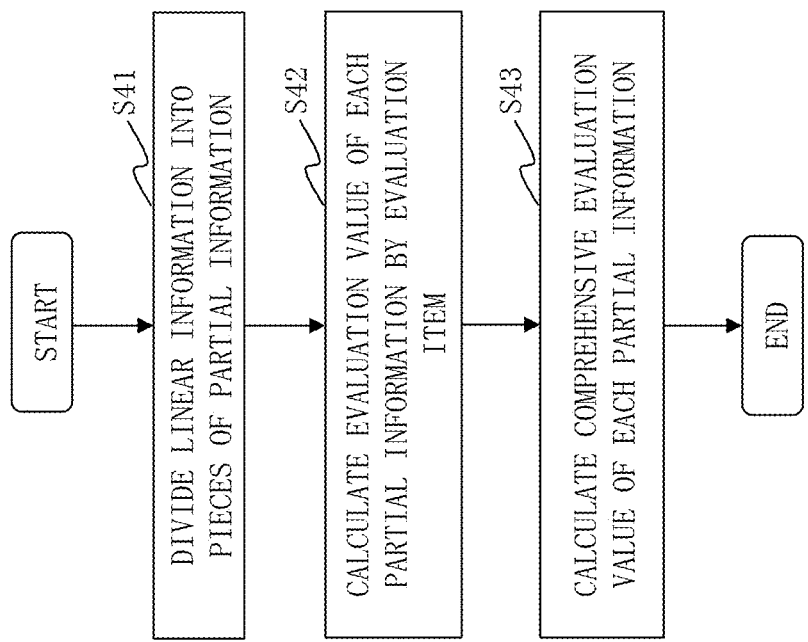
FIG. 20 is a flowchart according to Embodiment 1 of the evaluation process of a case where linearization information expresses a road shoulder edge.

(Step S41 of FIG. 20: Division Process)

The road shoulder edge evaluation unit 113b divides the linear information into pieces of partial information constituting the linearization information.

(Step S42 of FIG. 20: Individual Evaluation Process)

The road shoulder edge evaluation unit 113b calculates an evaluation value expressing a reliability degree of a position of a road shoulder edge indicated by each partial information.

Specifically, the height change evaluation unit 91, the parallel degree evaluation unit 92, the function approximation error quantity evaluation unit 93, and the measurement condition evaluation unit 94 calculate the evaluation value expressing the reliability degree of the position of the road shoulder edge indicated by the partial information, by the method to be described below.

The height change evaluation unit 91 finds a height difference (step) between a portion extracted as the road shoulder edge and a portion around the extracted portion, and evaluates a magnitude of the height difference. If the height difference is large, it may indicate that a definite position of the road shoulder edge has been acquired. Therefore, the larger the height difference, the more highly the height change evaluation unit 91 raises the evaluation value of the position information of the road shoulder edge.

In the above discussion, a height difference between the portion extracted as the road shoulder edge and the portion around the extracted portion is determined as an evaluation item. Alternatively, for example, a magnitude of an inclination of the height change at a boundary portion between the portion extracted as the road shoulder edge and the portion around the extracted portion, that is, the magnitude of the inclination, may be determined as the evaluation item.

The parallel degree evaluation unit 92, the function approximation error quantity evaluation unit 93, and the measurement condition evaluation unit 94 evaluate the position information of the road shoulder edge in accordance with the same method as that of the parallel degree evaluation unit 82, the function approximation error quantity evaluation unit 83, and the measurement condition evaluation unit 84 of the marking line evaluation unit 113*a*.

More specifically, the parallel degree evaluation unit 92 evaluates the parallel degree of the row of the road shoulder edge constituent points with respect to the moving trace of the measurement vehicle. When the row of the road shoulder edge constituent points is not parallel to the moving trace of the measurement vehicle, it is likely that road unevenness or the like has been erroneously detected as a road shoulder edge. Hence, the parallel degree evaluation unit 92 lowers the evaluation value of the position information of the road shoulder edge.

The function approximation error quantity evaluation unit 93 evaluates a magnitude of an error quantity sum of when the row of the road shoulder edge constituent points is cubic-function approximated by the least square. The smaller this value is, the more highly the function approximation error quantity evaluation unit 93 raises the evaluation value of the position information of the road shoulder edge.

The measurement condition evaluation unit 94 finds the evaluation value of the position information of the road shoulder edge from a distance from a point constituting the road shoulder edge to a position of the measurement vehicle at the time the measurement device has acquired the measured information used for estimation of the road shoulder, and from the weather at the time the measurement device has acquired the measured information used for estimation of the road shoulder edge. For example, if the road shoulder edge constituent point is far from the measurement vehicle, the data density becomes low and the data reliability decreases. Therefore, the farther the road shoulder edge constituent point is from the measurement device, the more the measurement condition evaluation unit 94 lowers the evaluation value of the position information of the road shoulder edge. In a bad weather such as rain, the reliability of the data acquired by the measurement device decreases. Therefore, the worse the weather is at the time the measured information is acquired, the more the measurement condition evaluation unit 94 lowers the evaluation value of the position information of the road shoulder edge.

(Step S43 of FIG. 20: Comprehensive Evaluation Process)

The road shoulder edge evaluation unit 113*b* calculates the evaluation value of the partial information by putting together the evaluation values calculated by the height change evaluation unit 91, the parallel degree evaluation unit 92, the function approximation error quantity evaluation unit 93, and the measurement condition evaluation unit 94 in step S42. According to a specific example, the road shoulder edge evaluation unit 113*b* weights the evaluation values calculated by the height change evaluation unit 91, the parallel degree evaluation unit 92, the function approximation error quantity evaluation unit 93, and the measurement condition evaluation unit 94, and adds up the weighted values, thereby calculating the evaluation value of the partial information.

The road shoulder edge evaluation unit 113*b* writes the evaluation value of the partial information to the primary map storage device 40 to correspond to the partial information. The road shoulder edge evaluation unit 113*b* may also write the evaluation values calculated individually by the height change evaluation unit 91, the parallel degree evaluation unit 92, the function approximation error quantity evaluation unit 93, and the measurement condition evaluation unit 94 to the primary map storage device 40 to correspond to the partial information.

The display process (step S14 of FIG. 5) according to Embodiment 1 will be described with referring to FIGS. 21 and 22.

Figure 21:
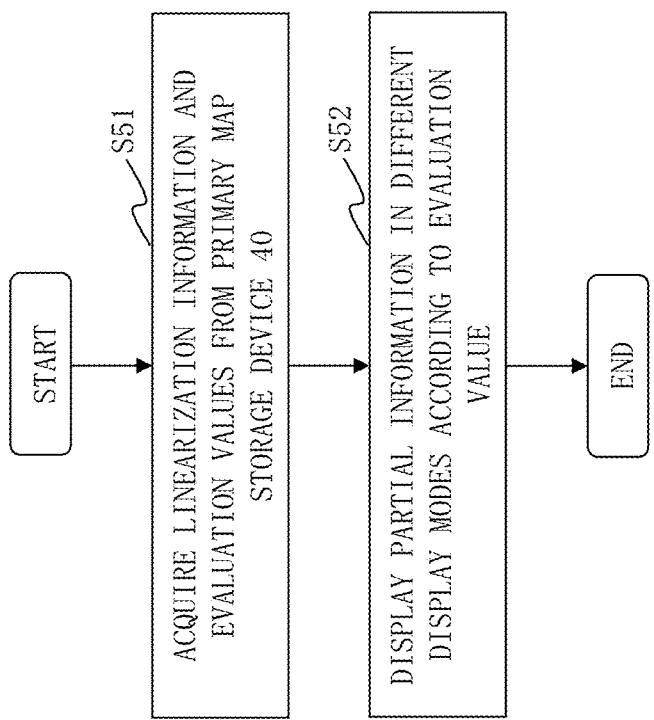
FIG. 21 is a flowchart of a display process according to Embodiment 1.

(Step S51 of FIG. 21: Information Acquisition Process)

The display unit 211 acquires the linearization information stored in the primary map storage device 40, and an evaluation value of each partial information constituting the linearization information which stored in the primary map storage device 40.

(Step S52 of FIG. 21: Linearization Information Display Process)

The display unit 211 displays the linearization information by displaying the partial information in different display modes according to the evaluation value, on the display device 26 connected via the communication interface 24. In this case, the display unit 211 displays the nodes and the links constituting the linearization information by superposing another point cloud data on them.

Figure 22:
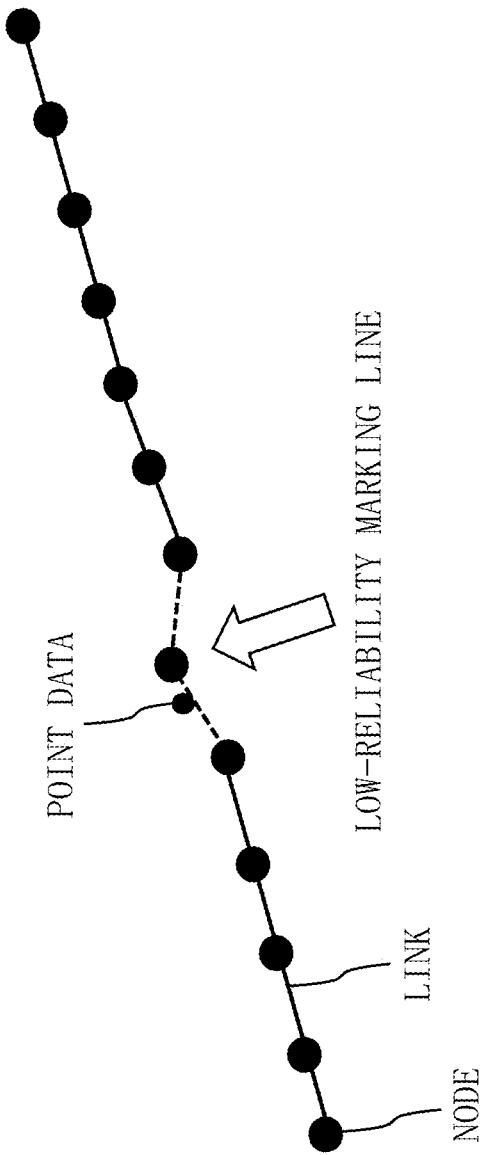
FIG. 22 is an explanatory diagram according to Embodiment 1 of a linearization information display process.

Specifically, as illustrated in FIG. 22, the display unit 211 identifies partial information whose evaluation value is lower than the threshold, out of the partial information constituting the linearization information. The display unit 211 displays partial information other than the identified partial information, that is, partial information having an evaluation value equal to or higher than the threshold, in a first display mode, and displays the identified partial information, that is, the partial information having an evaluation value lower than the threshold, in a second display mode which is different from the first display mode. In FIG. 22, the partial information having an evaluation value equal to or higher than the threshold is expressed by a solid line, and the partial information having an evaluation value lower than the threshold is expressed by a broken line. The display unit 211 may display the partial information having an evaluation value equal to or higher than the threshold in blue, and the partial information having an evaluation value lower than the threshold in red. Alternatively, the display unit 211 may display the partial information having an evaluation value lower than the threshold, with a line thicker than that of the partial information having an evaluation value equal to or higher than the threshold. Alternatively, the display unit 211 may display the partial information having an evaluation value lower than the threshold, with a higher luminance than that of the partial information having an evaluation value equal to or higher than the threshold. Alternatively, the display unit 211 may display the partial information having an evaluation value lower than the threshold, by blinking.

The display unit 211 may display the partial information in different display modes according to the height of the reliability degree expressed by the evaluation value. For example, the display unit 211 may display the partial information in different colors according to the height of the reliability degree expressed by the evaluation value. Also, the lower the reliability degree expressed by the evaluation degree may be, the higher the illuminance may be with which the display unit 211 displays the partial information.

In step S25 of FIG. 6, the display unit 211 may also display the corrected partial information in a display mode different from a mode in which another partial information is displayed. In this case, the display unit 211 may display the corrected partial information in a different display mode according to the correction content, for example, according to which correction has been done among Correction 1 to Correction 3.

An editing process (step S15 of FIG. 5) according to Embodiment 1 will be described with referring to FIGS. 23 to 28.

Figure 23:
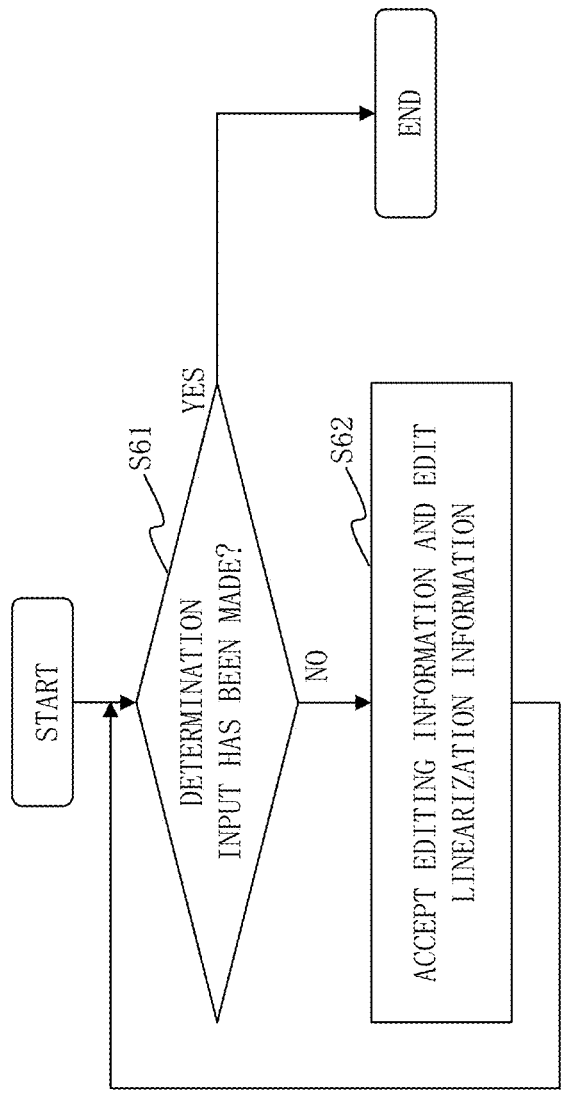
FIG. 23 is a flowchart of an editing process according to Embodiment 1.

(Step S61 of FIG. 23: Determination Judging Process)

The editing unit 212 judges whether or not determination input which determines linearization information has been made.

Specifically, the editing unit 212 judges whether or not a user has operated the input device 25 and has made determination input. For example, when the user has depressed a determination button signifying edit end, the editing unit 212 judges that determination input has been made.

If determination input has been made, the editing unit 212 writes the linearization information to the secondary map storage device 50 and ends the process. On the other hand, if determination input has not been made, the editing unit 212 advances the processing to step S62.

(Step S62 of FIG. 23: Editing Information Accepting Process)

The editing unit 212 accepts input of editing information which changes a position of at least one or the other of nodes and links constituting the linearization information. Upon acceptance of the editing information, the editing unit 212 edits the linearization information in accordance with the editing information.

Figure 24:
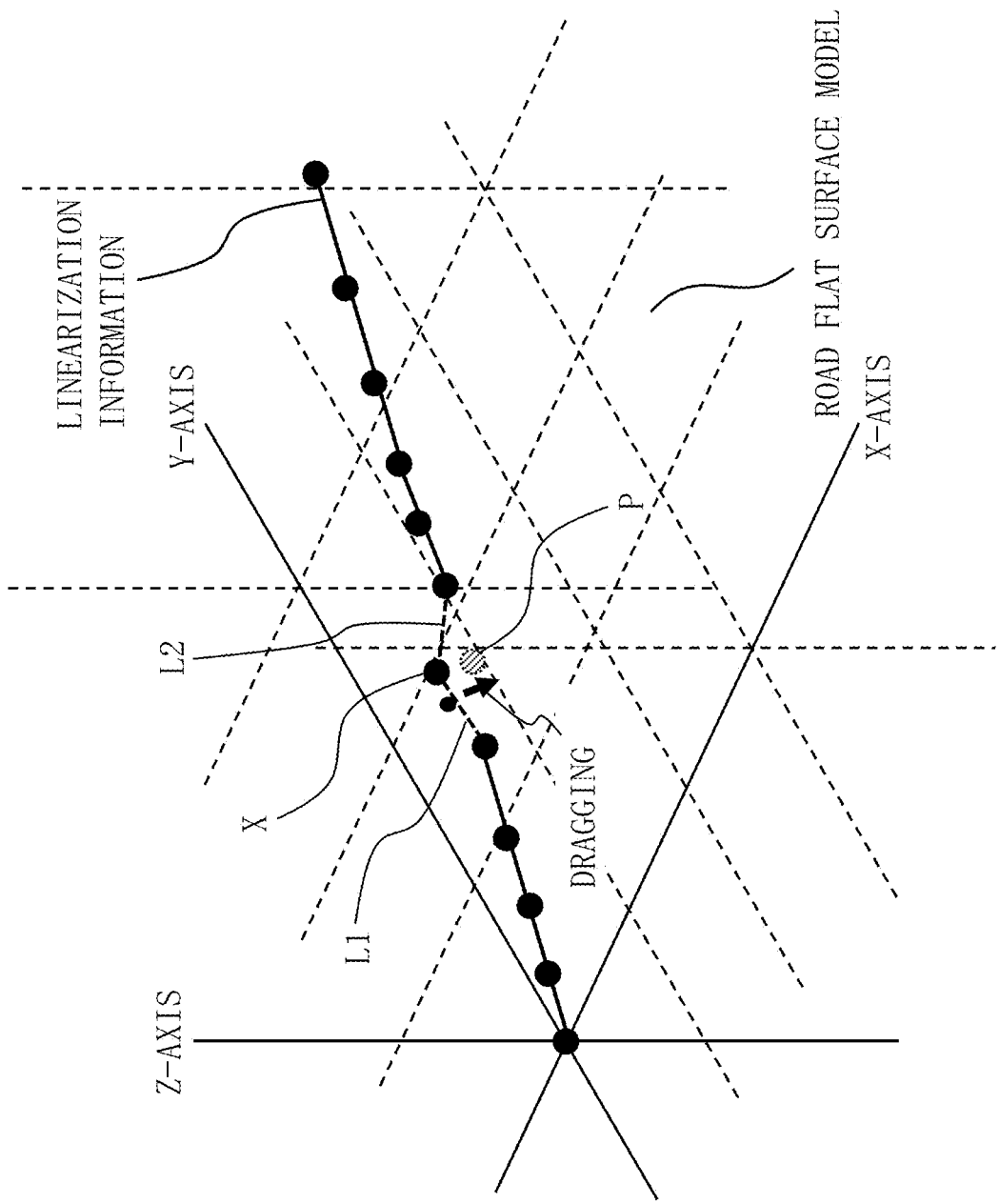
FIG. 24 is an explanatory diagram of a process of a display unit 211 according to Embodiment 1.
Figure 25:
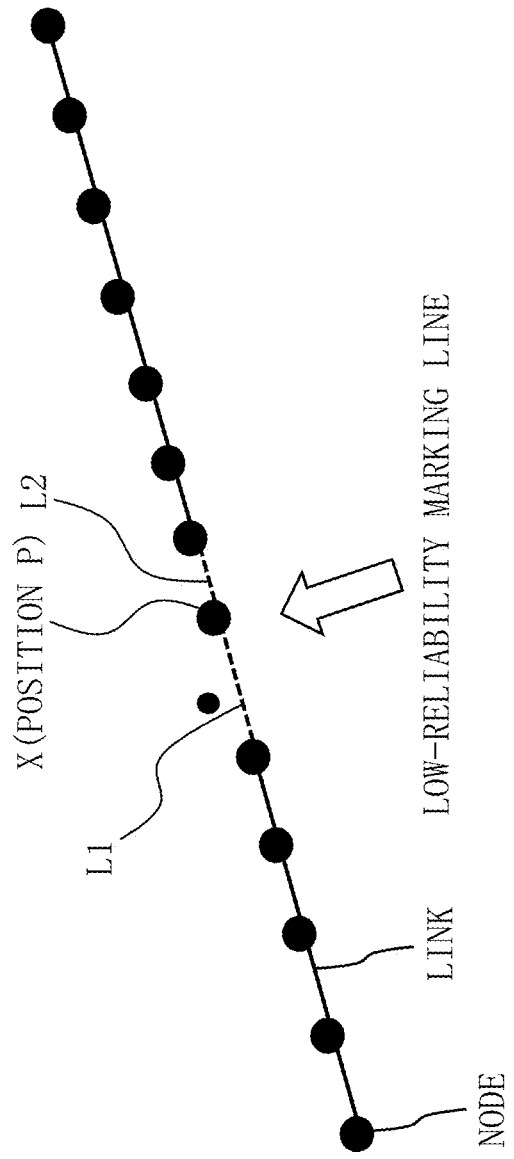
FIG. 25 is an explanatory diagram according to Embodiment 1 of a process of moving node positions.

Specifically, the editing unit 212 accepts designation of a target portion which is to be edited in the linearization information. For example, when a mouse being the input device 25 clicks, the editing unit 212 accepts a portion around a clicked position, as the target portion. Then, as illustrated in FIG. 24, the display unit 211 enlarges the designated portion, and displays nodes and links constituting the linearization information in the designated portion and point cloud data in the designated portion, to a screen on which grid lines expressing a three-dimensional coordinate system are displayed. Then, the editing unit 212 accepts input of the editing information which edits positions of the nodes and links displayed in enlargement. For example, a node is dragged by a mouse being the input device 25 and is dropped at a destination. Then, the editing unit 212 changes a position of the dragged node to a dropped position, and changes positions of links connected to the dragged node in accordance with the movement of the node. When a node X illustrated in FIG. 24 is dragged and dropped at a position P, the node X is changed to the position P, and accordingly positions of links L1 and L2 connected to the node X are changed, as illustrated in FIG. 25.

At this time, the display unit 211 may change a display angle to display the nodes and links and the point cloud data, in accordance with the user operation. That is, the display unit 211 may display the nodes and links and the point cloud data from a different point of view in accordance with the user operation.

Figure 26:
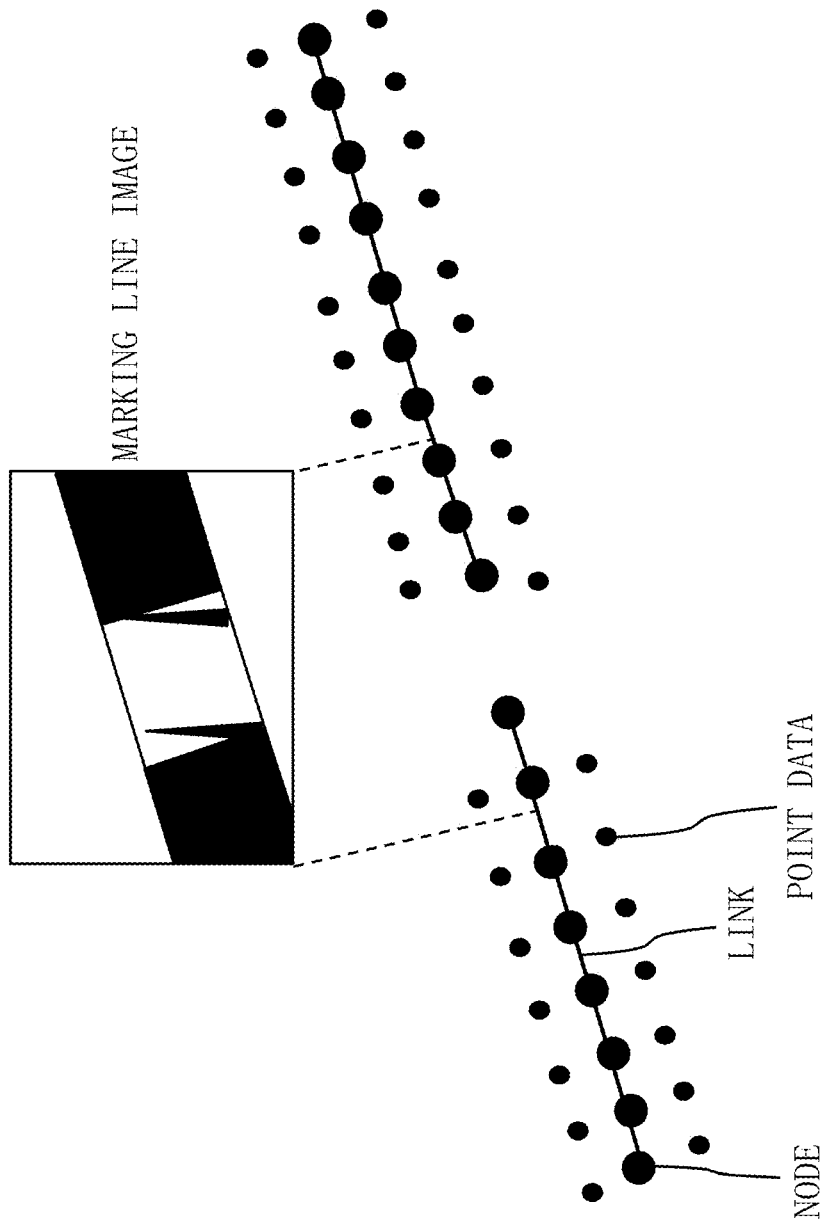
FIG. 26 is an explanatory diagram according to Embodiment 1 of a process of adding a new link.
Figure 27:
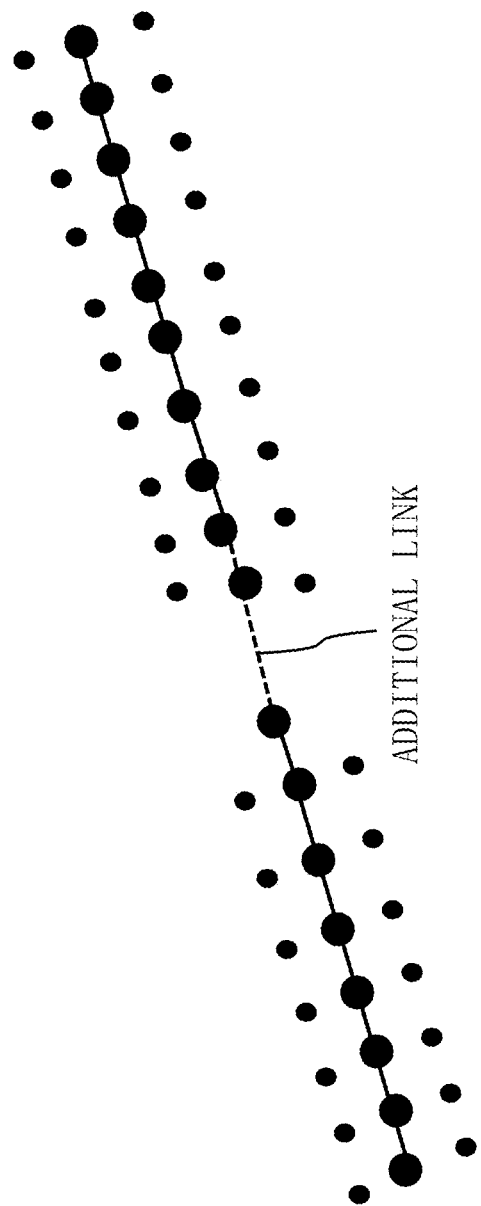
FIG. 27 is an explanatory diagram according to Embodiment 1 of a process of adding a new link.

The editing unit 212 may accept not only editing information to change a position of at least one or the other of nodes and links but may also accept editing information to add a new link or the like. For example, assume that the marking line is partly rubbed and thus disconnected, as illustrated in FIG. 26. In this case, the editing unit 212 accepts input of editing information to add a new link, and adds the link, thereby connecting the marking line, as illustrated in FIG. 27.

The display unit 211 may display image information about an editing target portion and around it which is obtained by a camera, separately from linearization information and point cloud information. This allows the user to perform editing operation while checking a situation of the marking line or road shoulder edge based on the image information.

The display unit 211 may change the display mode of the partial information edited by the editing unit 212. For example, if the partial information having an evaluation value lower than the threshold is edited by the editing unit 212, the display unit 211 displays the edited partial information in the same display mode as the partial information having an evaluation value equal to or higher than the threshold.

Effect of Embodiment 1

As described above, in the map generation system 1 according to Embodiment 1, partial information of linearization information is displayed in different display modes according to the evaluation value. Hence, a portion that is likely to be an error in the linearization information can be identified easily. Therefore, manual correction of an error in the linearization information can be performed efficiently.

In the map generation system 1 according to Embodiment 1, an editing target portion is enlarged and displayed on a screen on which grid lines expressing a three-dimensional coordinate system are displayed. This facilitates the user to edit appropriately the linearization information generated by the graphics unit 112.

\*\*\*Other Configurations\*\*\*

<Modification 1>

In step S12 of FIG. 5, the graphics unit 112 may identify a position of another road feature such as a sign around the roadway, a road surface sign, and a stop line based on measured information, and may generate vector data indicating the specified another road feature. When having generated vector data indicating the specified another road feature, the graphics unit 112 writes the vector data to the primary map storage device 40. In this case, the evaluation unit 113 calculates an evaluation value representing a reliability degree of the vector data. Then, the display unit 211 displays, together with the linearization information, the vector data in different modes according to the evaluation value. The editing unit 212 accepts input of the editing information about the vector data.

<Modification 2>

Figure 28:
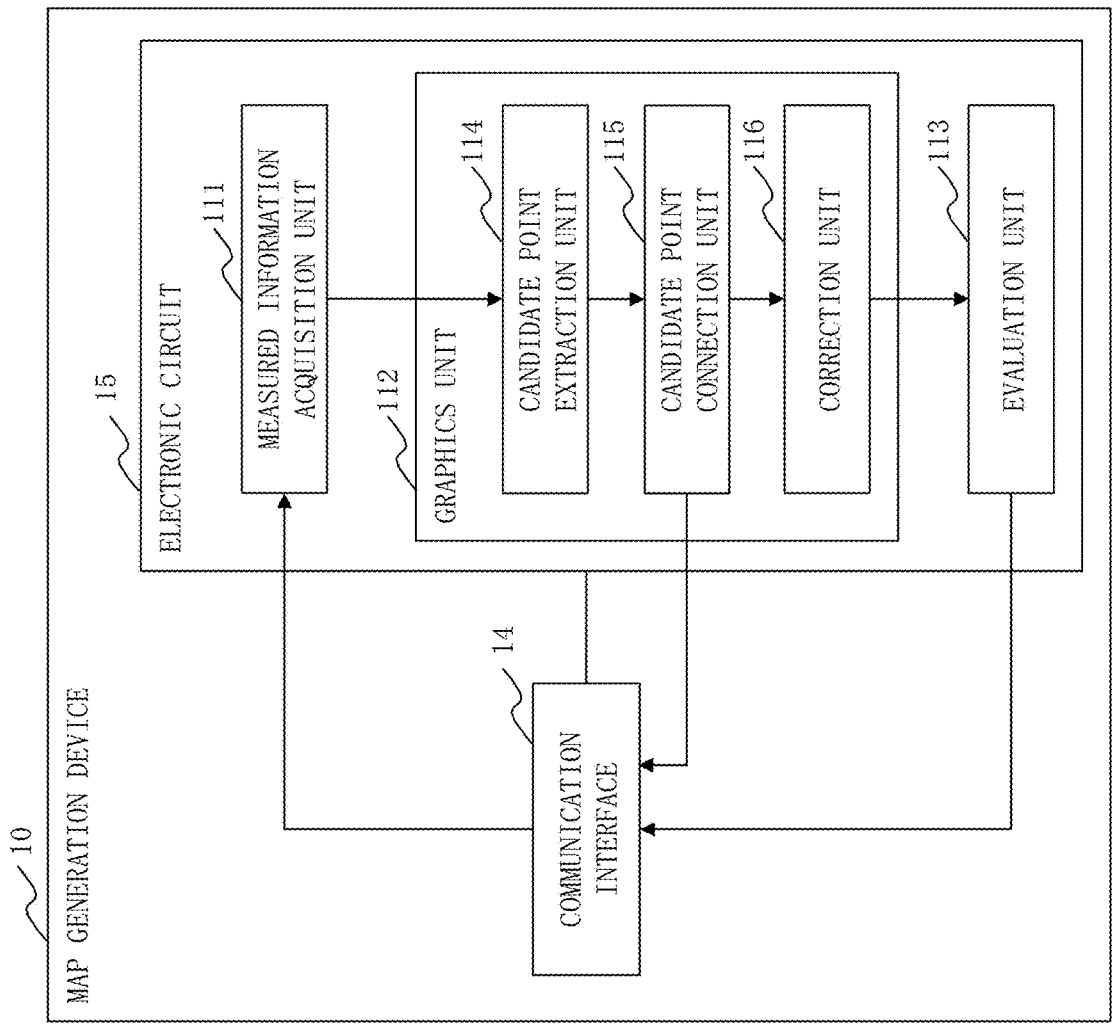
FIG. 28 is a configuration diagram according to Modification 2 of a map generation device 10.

A configuration of a map generation device 10 according to Modification 2 will be described with referring to FIG. 28.

When the functions are implemented by hardware, the map generation device 10 is provided with an electronic circuit 15 in place of the processor 11, the memory 12, and the storage 13. The electronic circuit 15 is a dedicated circuit that implements function constituent elements of the map generation device 10, and functions of the memory 12 and storage 13.

Figure 29:
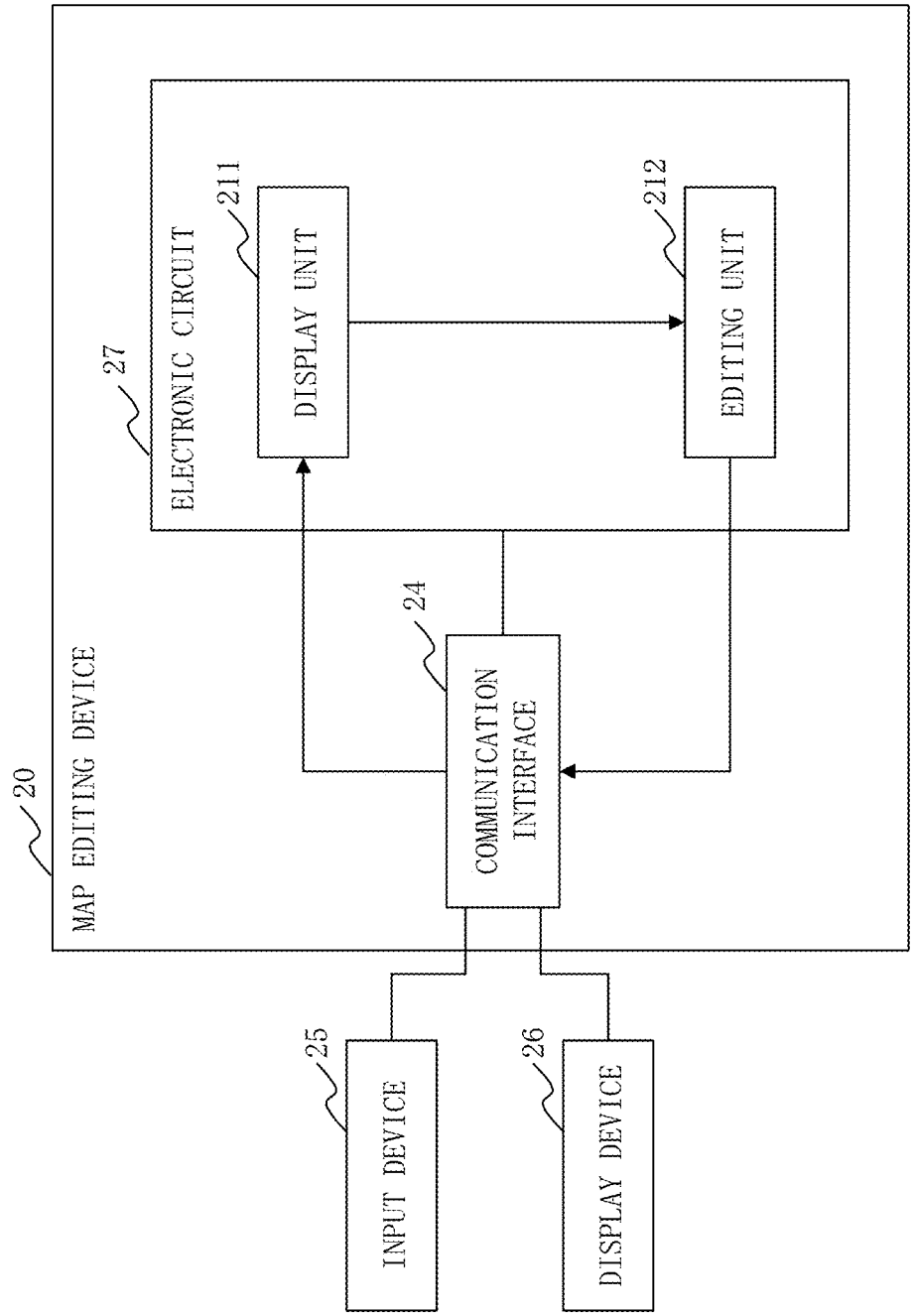
FIG. 29 is a configuration diagram according to Modification 2 of a map editing device 20.

A configuration of a map editing device 20 according to Modification 2 will be described with referring to FIG. 29.

When the functions are implemented by hardware, the map editing device 20 is provided with an electronic circuit 27 in place of the processor 21, the memory 22, and the storage 23. The electronic circuit 27 is a dedicated circuit that implements function constituent elements of the map editing device 20, and functions of the memory 22 and storage 23.

It is supposed that the electronic circuits 15 and 27 are each a single circuit, a composite circuit, a programmed processor, a parallel-programmed processor, a logic IC, a Gate Array (GA), an Application Specific Integrated Circuit (ASIC), and a Field-Programmable Gate Array (FPGA).

The functions of the individual function constituent elements of the map generation device 10 may be implemented by one electronic circuit 15, or may be distributed among a plurality of electronic circuits 15 and implemented by the plurality of electronic circuits 15. Likewise, regarding the map editing device 20, the functions of the individual function constituent elements may be implemented by one electronic circuit 27, or may be distributed among a plurality of electronic circuits 27 and implemented by the plurality of electronic circuits 27.

<Modification 3>

According to Modification 3, some of the functions may be implemented by hardware, and the remaining functions may be implemented by software. That is, functions of some of the individual function constituent element may be implemented by hardware, and functions of the remaining function constituent elements may be implemented by software.

The processors 11 and 21, the memories 12 and 22, the storages 13 and 23, and the electronic circuits 15 and 27 are called processing circuitry. Namely, the functions of the individual function constituent elements are implemented by processing circuitry.

Embodiment 2

Partial information having a low evaluation value is divided into groups according to a cause that lower the evaluation value. This is where Embodiment 2 is different from Embodiment 1. In Embodiment 2, this difference will be described, and the same point will not be described.

Figure 30:
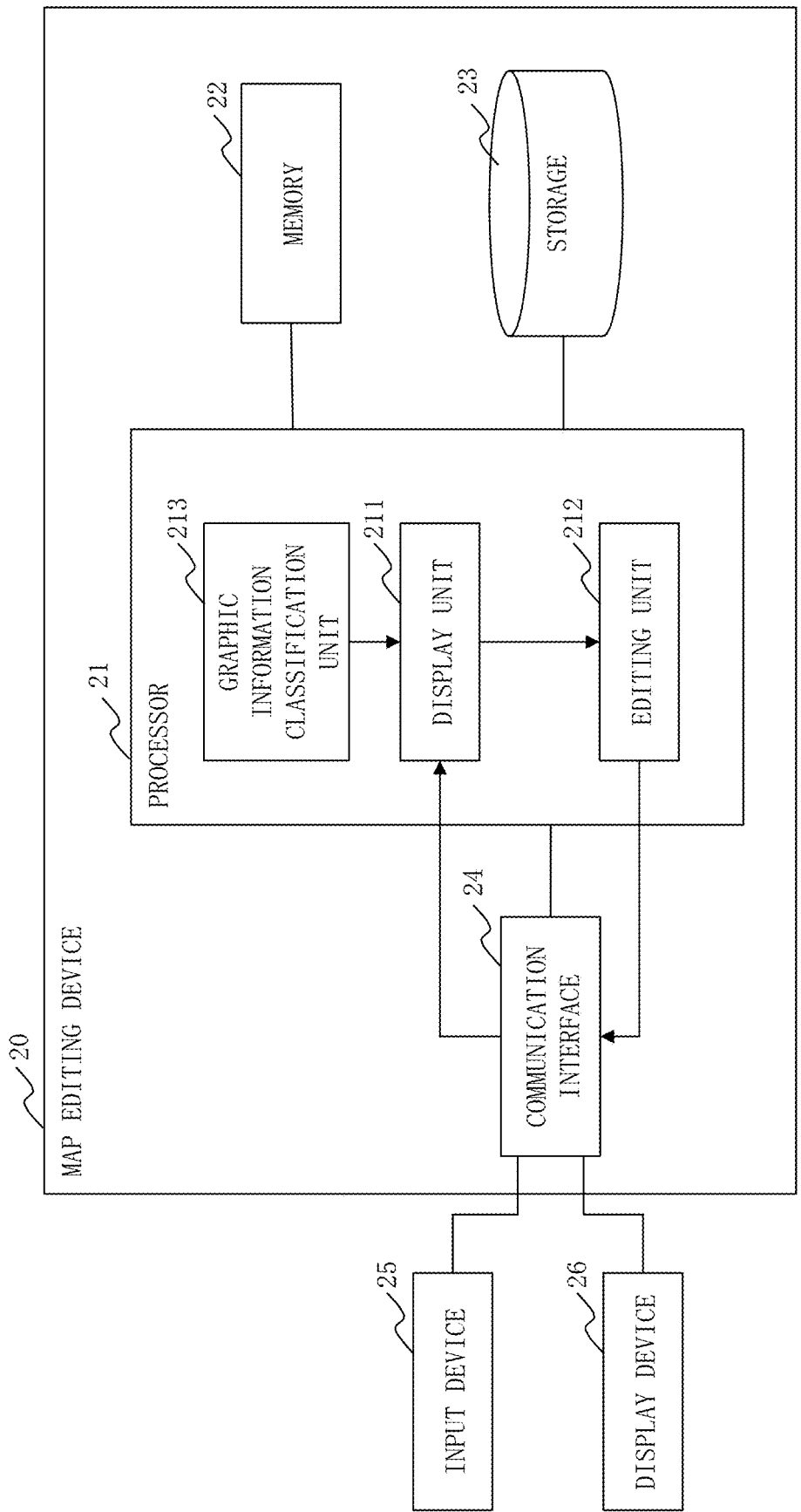
FIG. 30 is a configuration diagram according to Embodiment 2 of a map editing device 20.

\*\*\*Description of Configuration\*\*\* A configuration of a map editing device 20 according to Embodiment 2 will be described with referring to FIG. 30.

The map editing device 20 according to Embodiment 2 is provided with a graphic information classification unit 213. This is where the map editing device 20 of Embodiment 2 is different from the map editing device 20 of Embodiment 1.

\*\*\*Description of Operations\*\*\*

The graphic information classification unit 213 divides partial information having a low evaluation value into groups according to the cause that lowers the evaluation value. Specifically, the graphic information classification unit 213 classifies partial information having low evaluation values, in accordance with which one evaluation item among a plurality of evaluation items has a low evaluation value. In the case of a marking line, evaluation items are items evaluated individually by a reflection intensity change quantity evaluation unit 81, a parallel degree evaluation unit 82, a function approximation error quantity evaluation unit 83, and a measurement condition evaluation unit 84. In the case of a road shoulder edge, evaluation items are items which are evaluated individually by a height change evaluation unit 91, a parallel degree evaluation unit 92, a function approximation error quantity evaluation unit 93, and a measurement condition evaluation unit 94.

As a grouping example, an example will be described in which the graphic information classification unit 213 divides marking lines into groups. First, the graphic information classification unit 213 extracts marking lines whose position information have reliability degrees equal to or less than a predetermined degree in the map information. Then, the graphic information classification unit 213 classifies the extracted marking lines among first to fourth groups. For example, the first group is a group of marking lines whose functionally approximated error quantities have evaluation values equal to or less than a predetermined value. The second group is a group of marking lines which do not correspond to the first group and whose parallel degrees with respect to a moving trace of a measurement vehicle have evaluation values equal to or less than a predetermined value. The third group is a group of marking lines which do not correspond to the first or second group and whose reflection intensity change quantities have evaluation values equal to or less than a predetermined value. The fourth group is a group of marking lines which do not correspond to first, second, or third group and whose measurement conditions have evaluation values equal to or less than a predetermined value.

Figure 31:
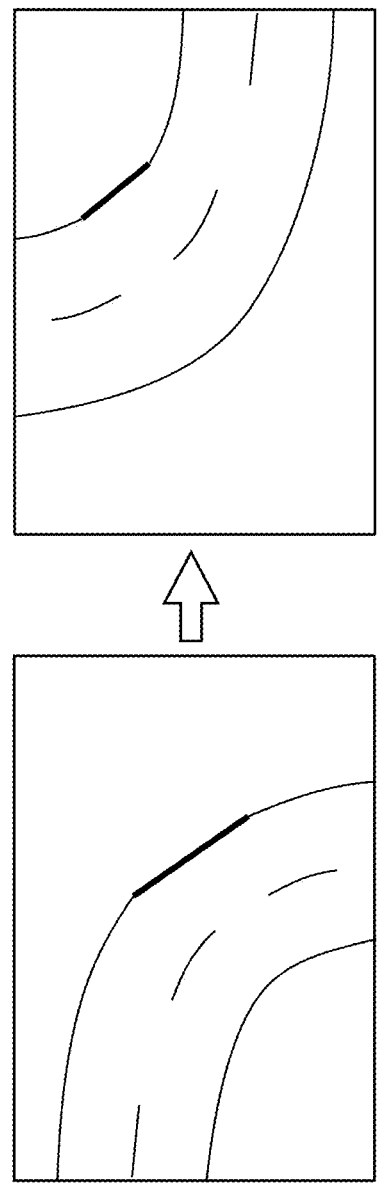
FIG. 31 is a diagram according to Embodiment 2 illustrating a screen transition example of when pieces of partial information belonging to the same group are to be displayed consecutively.
Figure 32:
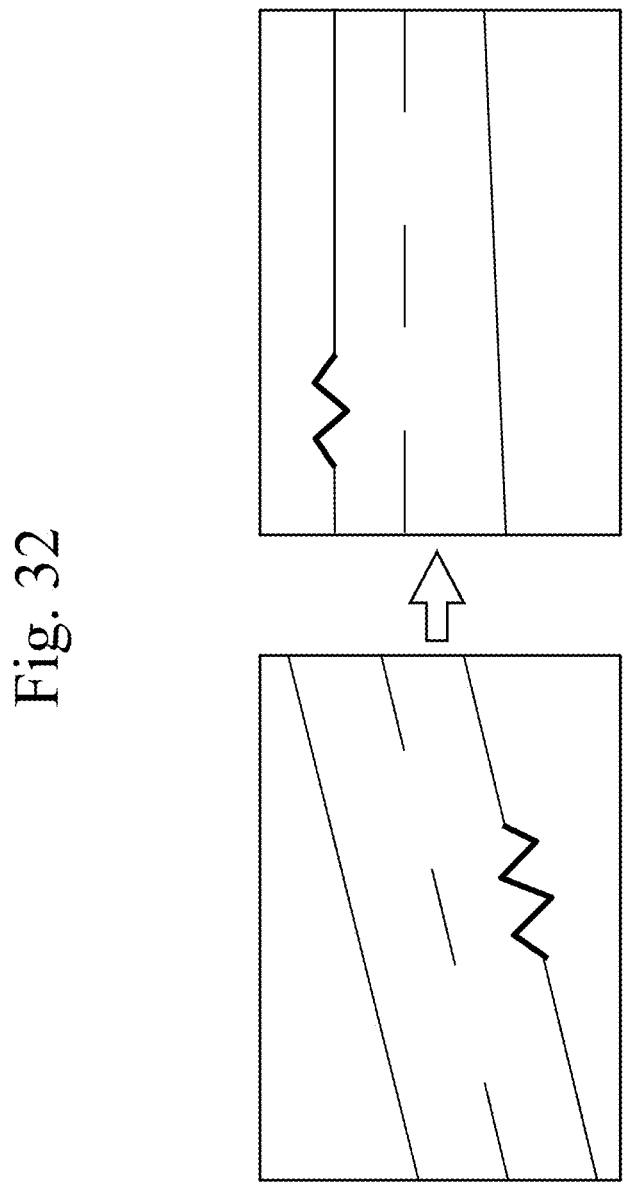
FIG. 32 is a diagram according to Embodiment 2 illustrating a screen transition example of when pieces of partial information belonging to the same group are to be displayed consecutively.

When displaying linearization information, a display unit 211 can switch a screen display such that pieces of partial information belonging to the same group are displayed consecutively. FIGS. 31 and 32 illustrate screen transition examples of when pieces of partial information belonging to the same group are to be displayed consecutively. By operating the input device 25, the user can switch the screen display such that pieces of partial information (a marking line expressed by a thick line) whose position information have evaluation values which are lowered by the same cause are displayed consecutively on the screen of the display device 26, as illustrated in FIGS. 31 and 32.

Effect of Embodiment 2

As described above, in the map generation system 1 according to Embodiment 2, partial information having a low evaluation value is divided into groups according to a cause that lowers the evaluation value. Hence, when displaying linearization information, a screen display can be switched such that pieces of partial information belonging to the same group are displayed consecutively.

As a result, the user can successively check and correct pieces of partial information whose evaluation values are lowered by the same cause. Correcting operations for the pieces of partial information whose evaluation values are lowered by the same cause often have similar contents. When such pieces of partial information are corrected consecutively, the correcting operations for the linearization information become smooth.

Embodiment 3

An evaluation value to be calculated is changed in accordance with whether or not correction has been made in the past. This is where Embodiment 3 is different from Embodiment 1 or 2. In Embodiment 3, this difference will be described, and the same point will not be described.

\*\*\*Description of Configuration\*\*\*

Figure 33:
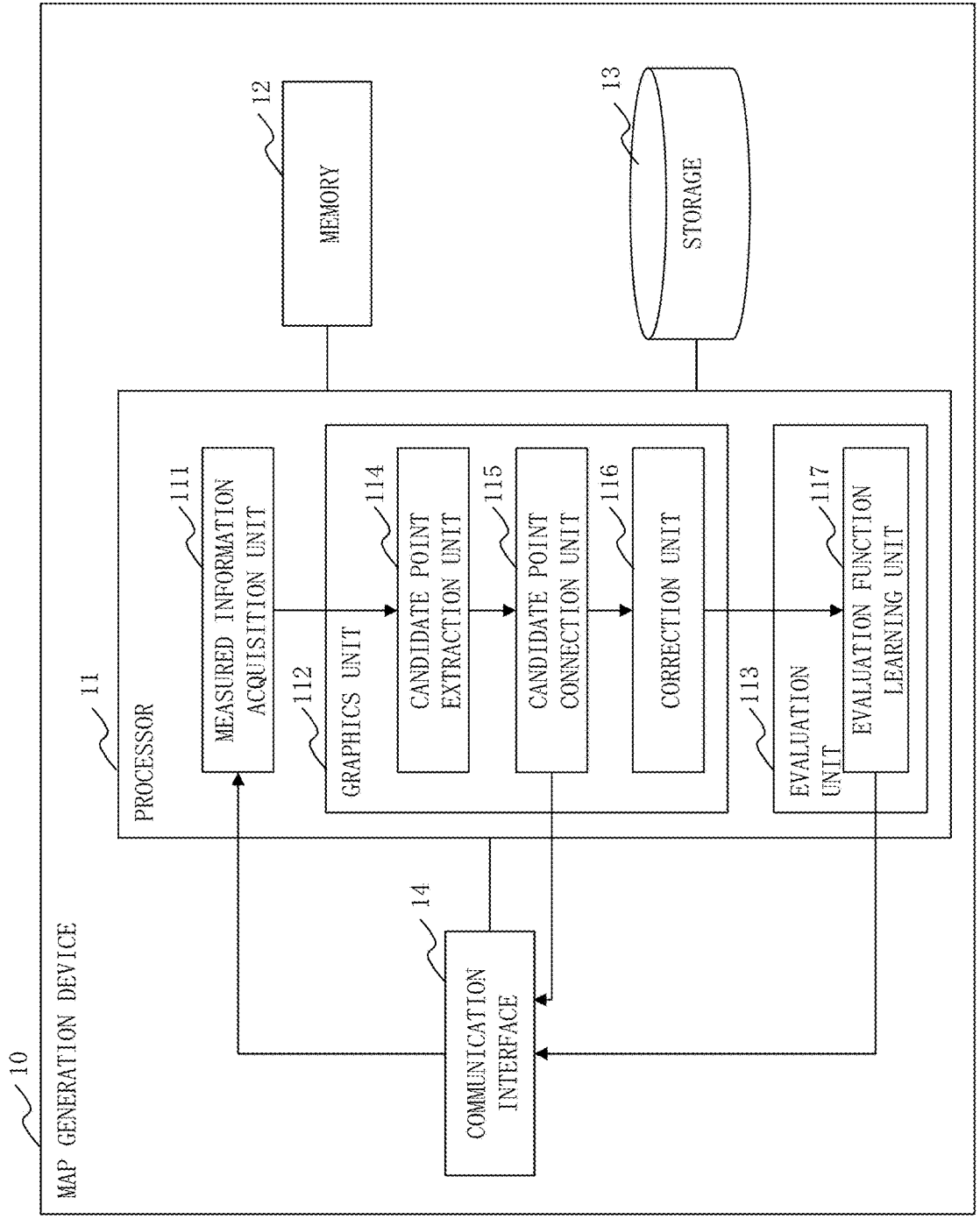
FIG. 33 is a configuration diagram according to Embodiment 3 of a map generation device 10.

A configuration of a map generation device 10 according to Embodiment 3 will be described with referring to FIG. 33.

In the map generation device 10 according to Embodiment 3, an evaluation unit 113 is provided with an evaluation function learning unit 117. This is where the map generation device 10 according to Embodiment 3 is different from the map generation device 10 of Embodiment 1 or 2.

*Description of Operations*

The evaluation function learning unit 117 learns how evaluation values of a plurality of evaluation items about partial information correspond to whether or not that partial information has been corrected by a map editing device 20. Then, the evaluation function learning unit 117 corrects an evaluation method of calculating a comprehensive evaluation value, such that a comprehensive evaluation value becomes low for partial information whose individual evaluation items have evaluation values similar to those of partial information corrected in the past, and such that a comprehensive evaluation value becomes high for partial information whose individual evaluation items have evaluation values similar to those of partial information not corrected in the past. A comprehensive evaluation value is an evaluation value calculated in step S33 of FIG. 18 and step S43 of FIG. 20.

This will be specifically described with referring to FIGS. 34 and 35.

In the example of FIG. 34, correction by the map editing device 20 tends to be carried out on partial information (graphic data number 2, 3) whose evaluation item A has a low evaluation value, or on partial information (graphic data number 6, 8) whose evaluation items B and C have low evaluation values. Once the evaluation function learning unit 117 learns this tendency, a marking line evaluation unit 113*a* and a road shoulder edge evaluation unit 113*b* lower a comprehensive evaluation value about partial information (graphic data number 12) whose evaluation item A has a low evaluation value, and partial information (graphic data number 14) whose evaluation items B and C both have low evaluation values, as illustrated in, for example, FIG. 35.

Effect of Embodiment 3

As described above, in the map generation system 1 according to Embodiment 3, an evaluation value to be calculated is changed in accordance with whether or not the evaluation value has been corrected in the past. Hence, correction necessity is additionally involved in the evaluation value of the partial information. As a result, the user can properly judge whether or not correction is necessary from the magnitude of the evaluation value.

Embodiments and modifications of the present invention have been described above. Of these embodiments and modifications, some may be combined and practiced. Any one or several ones of the embodiments and modifications may be practiced partly. The present invention is not limited to the above embodiments and modifications, and various changes may be made as necessary.

REFERENCE SIGNS LIST

1: map generation system; 10: map generation device; 11: processor; 12: memory; 13: storage; 14: communication interface; 15: electronic circuit; 111: measured information acquisition unit; 112: graphics unit; 113: evaluation unit; 113*a*: marking line evaluation unit; 113*b*: road shoulder edge evaluation unit; 114: candidate point extraction unit; 115: candidate point connection unit; 116: correction unit; 117: evaluation function learning unit; 20: map editing device; 21: processor; 22: memory; 23: storage; 24: communication interface; 25: input device; 26: display device; 27: electronic circuit; 211: display unit; 212: editing unit; 213: graphic information classification unit; 30: measured information storage device; 40: primary map storage device; 50: secondary map storage device; 60: transmission lines; 70: transmission lines; 81: reflection intensity change quantity evaluation unit; 82: parallel degree evaluation unit; 83: function approximation error quantity evaluation unit; 84: measurement condition evaluation unit; 91: height change evaluation unit; 92: parallel degree evaluation unit; 93: function approximation error quantity evaluation unit; 94: measurement condition evaluation unit.

The invention claimed is:

1. A map generation system comprising:
processing circuitry to:
generate linearization information expressing at least one or the other of a marking line of a roadway and a road shoulder edge based on measurement information of a periphery of the roadway, the measurement information being obtained by a measurement device;
calculate an evaluation value expressing a reliability degree of partial information, for each partial information constituting the generated linearization information;
display the partial information in different modes according to the calculated evaluation value thereby displaying the linearization information; and
accept input of editing information for the displayed linearization information.

2. The map generation system according to claim 1,
wherein the measurement information includes point cloud data being a plurality of pieces of point data expressing a position of a feature on the periphery of the roadway,
wherein the processing circuitry generates the linearization information by selecting point data included in the point cloud data as nodes, and connecting the selected nodes with links, and
wherein the processing circuitry displays the nodes and the links representing the linearization information, and the point cloud data, by superposing.

3. The map generation system according to claim 2,
wherein the processing circuitry displays the linearization information in a designated portion and the point cloud data in the designated portion, in enlargement.

4. The map generation system according to claim 2,
wherein the processing circuitry displays the linearization information in a designated portion and the point cloud data in the designated portion, to a screen on which grid lines expressing a three-dimensional coordinate system are displayed.

5. The map generation system according to claim 2,
wherein the processing circuitry accepts input of editing information of at least one of add, delete, and move for at least one or the other of the nodes and the links.

6. The map generation system according to claim 2,
wherein the measurement information is obtained by the measurement device while a mobile body on which the measurement device is mounted moves, the measurement information including moving trace information expressing a trace of positions of the mobile body, and
wherein the processing circuitry generates the linearization information by selecting point data included in the point cloud data, as the nodes and connecting the nodes with the links, based on the moving trace information.

7. The map generation system according to claim 6,
wherein the processing circuitry extracts a plurality of pieces of point data that are likely to indicate an edge portion of the roadway, as candidate point data from the point cloud data, and performs grouping on the extracted candidate point data according to a position and, concerning pieces of the candidate point data included in each group, to connect the pieces of the candidate point data based on a distance between individual pieces of the candidate point data and based on a distance from the candidate point data to a trace indicated by the moving trace information, thereby generating the linearization information of each group.

8. The map generation system according to claim 7,
wherein the processing circuitry treats, as a target, the linearization information having a length equal to or less than a first reference distance among the generated linearization information, and to delete the linearization information being the target if another linearization information longer than the linearization information being the target exists on an opposite side of the trace.

9. The map generation system according to claim 7,
wherein the processing circuitry treats segment information constituting part of the generated linearization information, as a target, and to delete the segment information being the target if the segment information being the target is nearer to the trace than another adjacent segment information located before the segment information being the target and then another adjacent segment information located after the segment information being the target, by a second reference distance or more.

10. The map generation system according to claim 7,
wherein the processing circuitry treats segment information constituting part of the linearization information, as a target, and to delete the segment information being the target if an average distance between the segment information being the target and an approximate curve, which is obtained by cubic-function approximating point data constituting the segment information being the target, is equal to or more than a third reference distance.

11. The map generation system according to claim 10,
wherein the processing circuitry connects point data near to the trace and constituting the deleted segment information being the target, thereby regenerating the segment information being the target.

12. A map generation method comprising:
generating linearization information expressing at least one or the other of a marking line of a roadway and a road shoulder edge based on measurement information of a periphery of the roadway, the measurement information being obtained by a measurement device;
calculating an evaluation value expressing a reliability degree of partial information, for each partial information constituting the linearization information;
displaying the partial information in different modes according to the evaluation value, thereby displaying the linearization information; and
accepting input of editing information for the displayed linearization information.

13. A non-transitory computer readable medium storing a map generation program which causes a computer to execute:
a graphics process of generating linearization information expressing at least one or the other of a marking line of a roadway and a road shoulder edge based on measurement information of a periphery of the roadway, the measurement information being obtained by a measurement device;
an evaluation process of calculating an evaluation value expressing a reliability degree of partial information, for each partial information constituting the linearization information generated by the graphics process;
a display process of displaying the partial information in different modes according to the evaluation value calculated by the evaluation process, thereby displaying the linearization information; and
an editing process of accepting input of editing information for the linearization information displayed by the display process.

\* \* \* \* \*